(12) United States Patent
Ikeda et al.

(10) Patent No.: US 9,235,034 B2
(45) Date of Patent: *Jan. 12, 2016

(54) VARIABLE MAGNIFICATION OPTICAL SYSTEM AND IMAGING APPARATUS

(71) Applicant: FUJIFILM Corporation, Tokyo (JP)

(72) Inventors: Shinkichi Ikeda, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/175,431

(22) Filed: Feb. 7, 2014

(65) Prior Publication Data

US 2014/0177066 A1    Jun. 26, 2014

Related U.S. Application Data

(63) Continuation of application No. PCT/JP2012/005428, filed on Aug. 29, 2012.

(30) Foreign Application Priority Data

Aug. 30, 2011    (JP) .................................. 2011-187419

(51) Int. Cl.
   *G02B 15/14*    (2006.01)
   *G02B 13/00*    (2006.01)
   (Continued)

(52) U.S. Cl.
   CPC .............. *G02B 15/14* (2013.01); *G02B 13/009* (2013.01); *G02B 13/18* (2013.01); *G02B 15/17* (2013.01)

(58) Field of Classification Search
   CPC ...... G02B 13/009; G02B 15/14; G02B 15/15; G02B 15/16; G02B 15/167

USPC .................................. 359/676–679, 683–685
See application file for complete search history.

(56) References Cited

U.S. PATENT DOCUMENTS 5,636,060 A     6/1997  Suzuki
6,278,559 B1 *  8/2001  Yahagi .......................... 359/683
(Continued)

FOREIGN PATENT DOCUMENTS

JP    09-258102      10/1997
JP    2003-287678    10/2003
(Continued)

OTHER PUBLICATIONS

International Search Report, PCT/JP2012/005428, Dec. 11, 2012.

*Primary Examiner* — Darryl J Collins
(74) *Attorney, Agent, or Firm* — Young & Thompson

(57) ABSTRACT

A variable magnification optical system substantially consists of a first lens-group having positive refractive-power, and which is fixed during magnification change, a second lens-group having negative refractive-power, a third lens-group having negative refractive-power, a fourth lens-group having negative refractive-power, an aperture stop, which is fixed during magnification change, and a fifth lens-group having positive refractive-power, and which is fixed during magnification change, in this order from an object-side along an optical-axis. The second, third and fourth lens-groups move in such a manner that a distance between the first lens-group and the second lens-group constantly becomes longer and a distance between the second lens-group and the third lens-group constantly becomes longer, compared with a wide-angle end, and a distance between the third lens-group and the fourth lens-group and a distance between the fourth lens-group and the fifth lens-group change when magnification is changed from the wide-angle end to a telephoto end.

10 Claims, 13 Drawing Sheets

(51) Int. Cl.
*G02B 13/18* (2006.01)
*G02B 15/17* (2006.01)

(56) References Cited

U.S. PATENT DOCUMENTS

| 6,512,637 | B1 | 1/2003 | Tomita |
| 2001/0019455 | A1 | 9/2001 | Miyano |
| 2004/0042075 | A1 | 3/2004 | Yoshimi et al. |
| 2006/0285224 | A1 | 12/2006 | Endo et al. |
| 2012/0250163 | A1* | 10/2012 | Wakazono et al. ............ 359/683 |
| 2012/0300118 | A1* | 11/2012 | Shimomura et al. .......... 348/360 |
| 2014/0049672 | A1* | 2/2014 | Sakamoto ..................... 348/294 |

FOREIGN PATENT DOCUMENTS

| JP | 2004-126631 | 4/2004 |
| JP | 2005-084409 | 3/2005 |
| JP | 2006-349947 | 12/2006 |
| JP | 2011-081063 | 4/2011 |

* cited by examiner

FIG.1
EXAMPLE 1
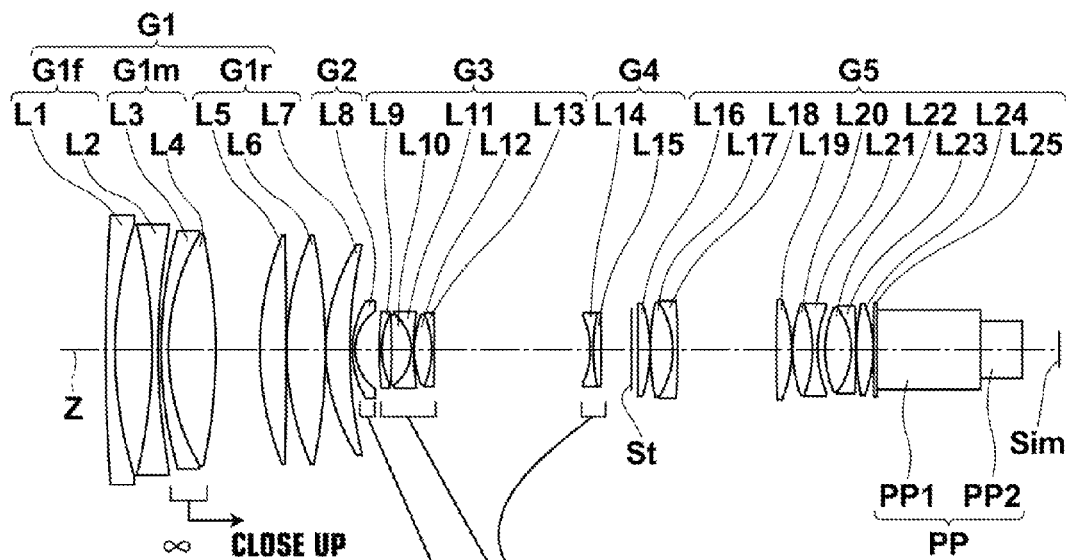
A WIDE-ANGLE END
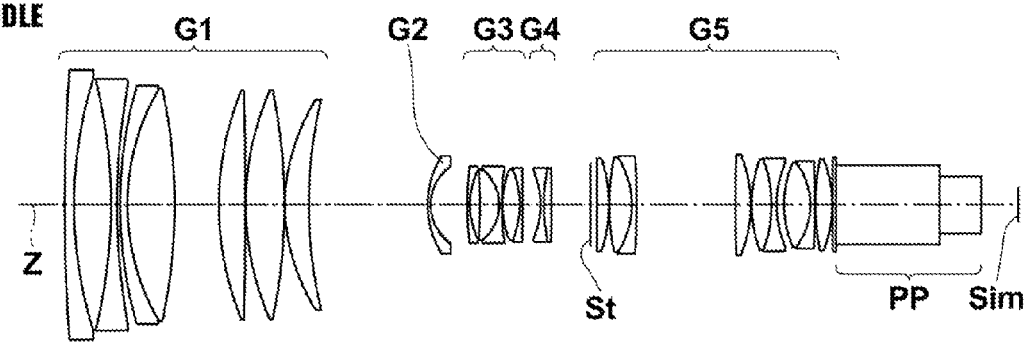
B MIDDLE
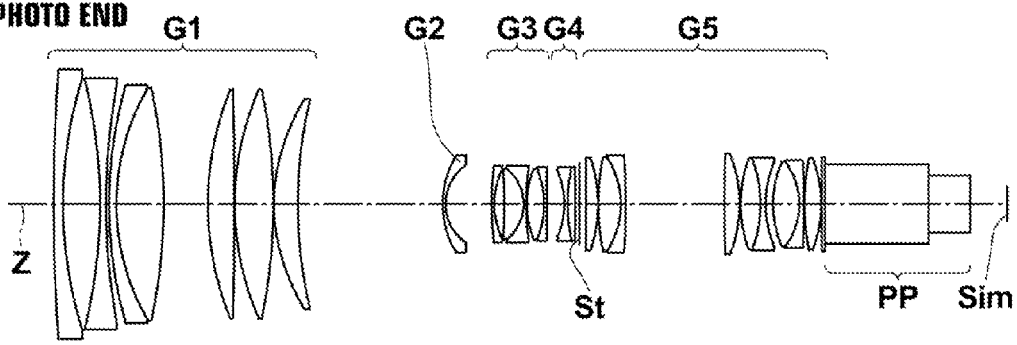
C TELEPHOTO END FIG.2
EXAMPLE 2
A WIDE-ANGLE END
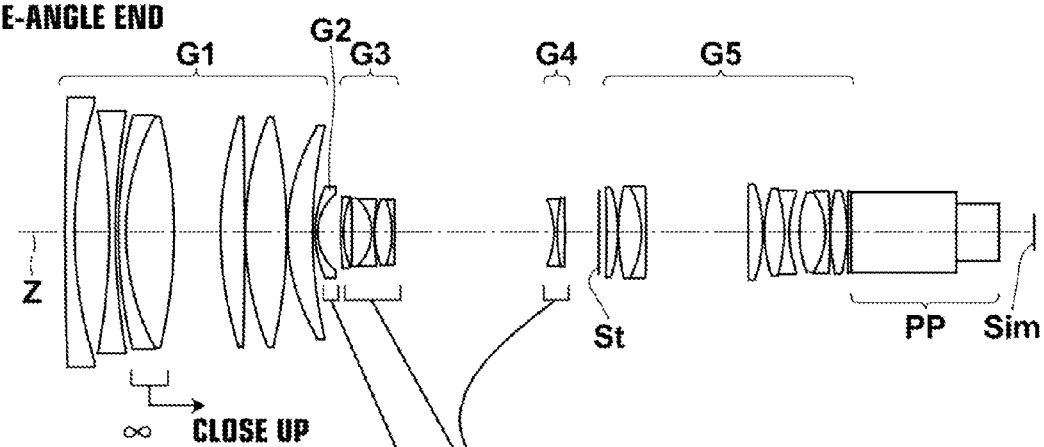
B MIDDLE
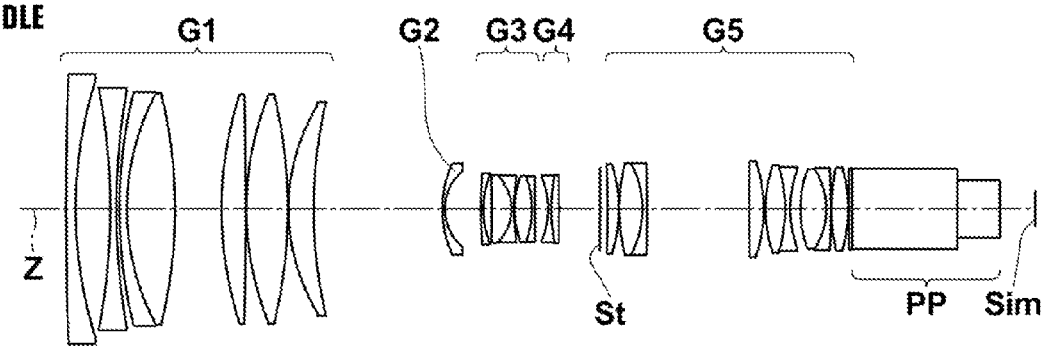
C TELEPHOTO END
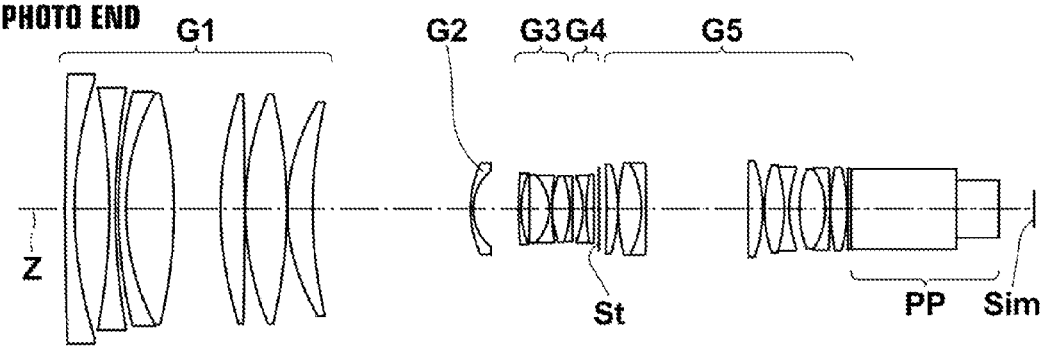

FIG.3 EXAMPLE 3
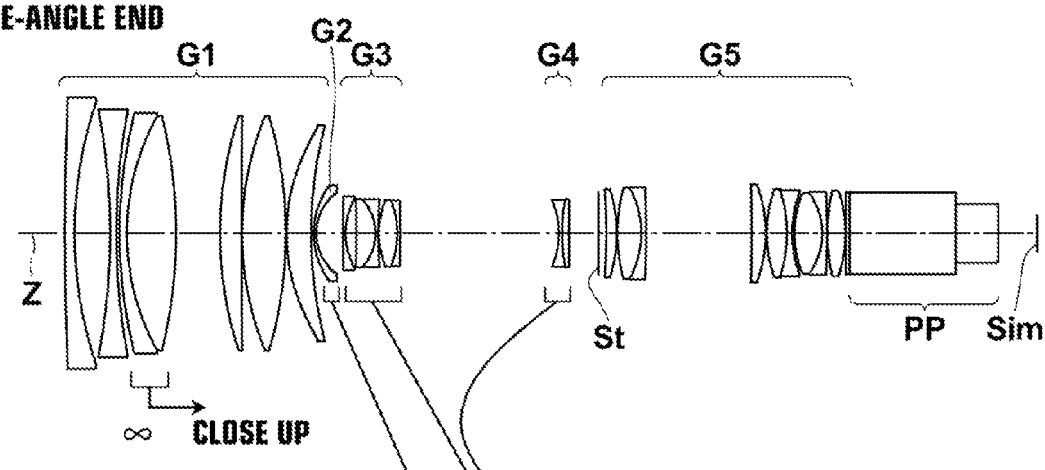
A WIDE-ANGLE END
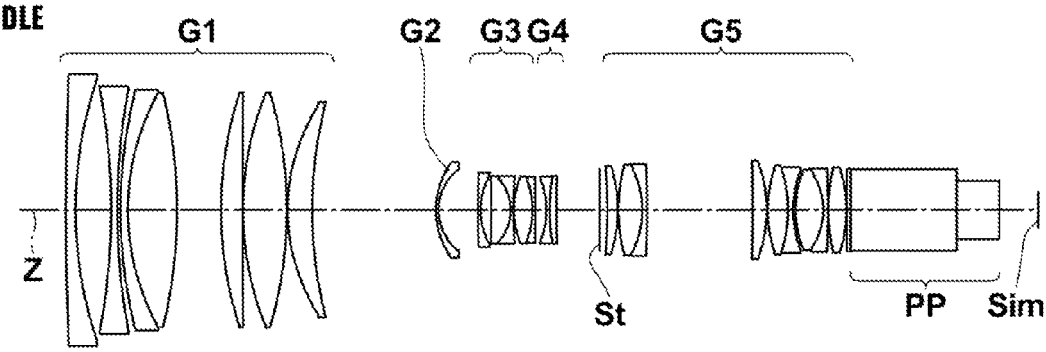
B MIDDLE
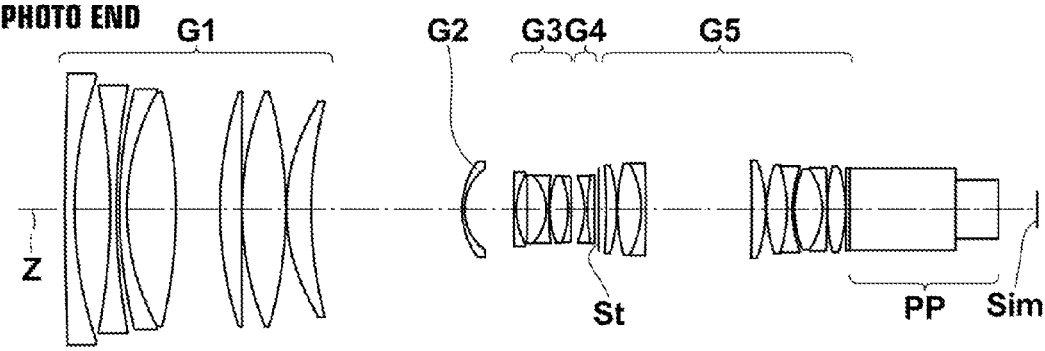
C TELEPHOTO END EXAMPLE 4
FIG.4
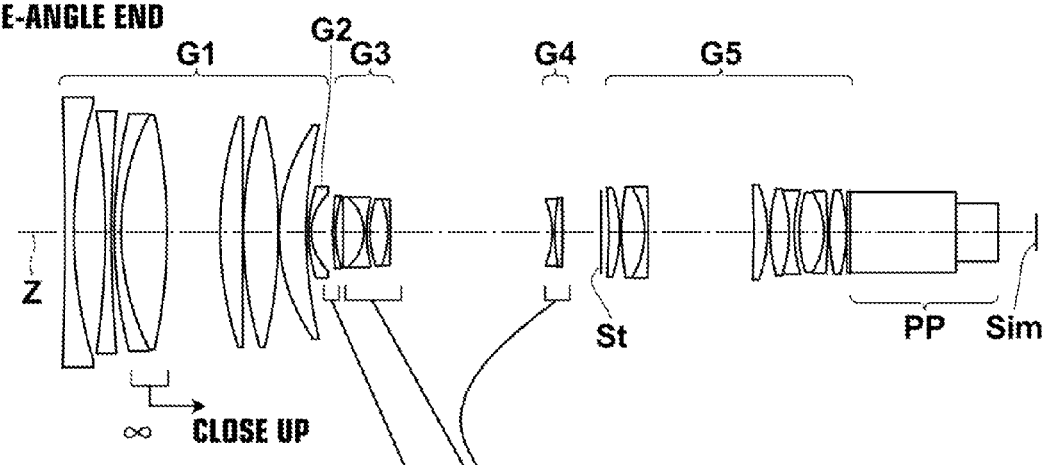
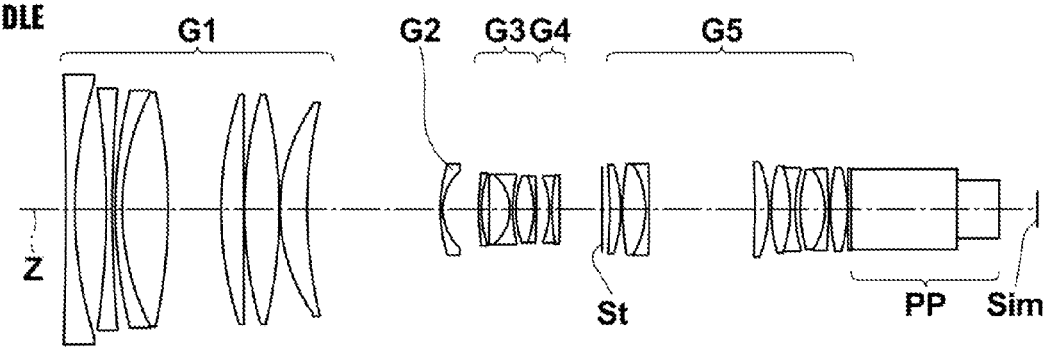
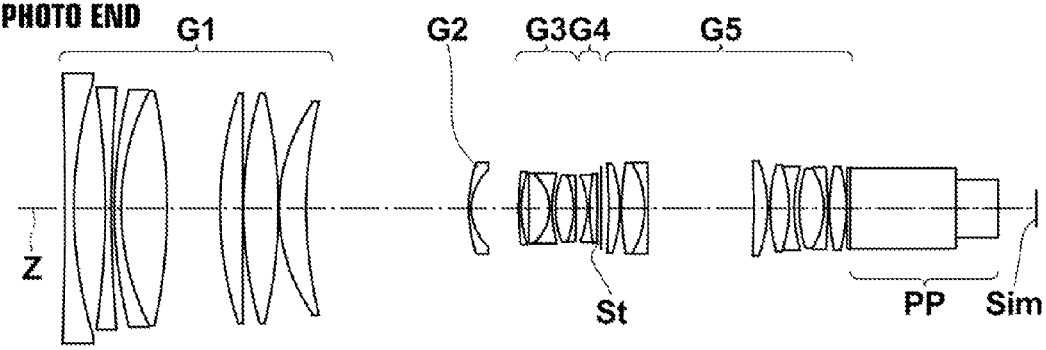

FIG.5
EXAMPLE 5
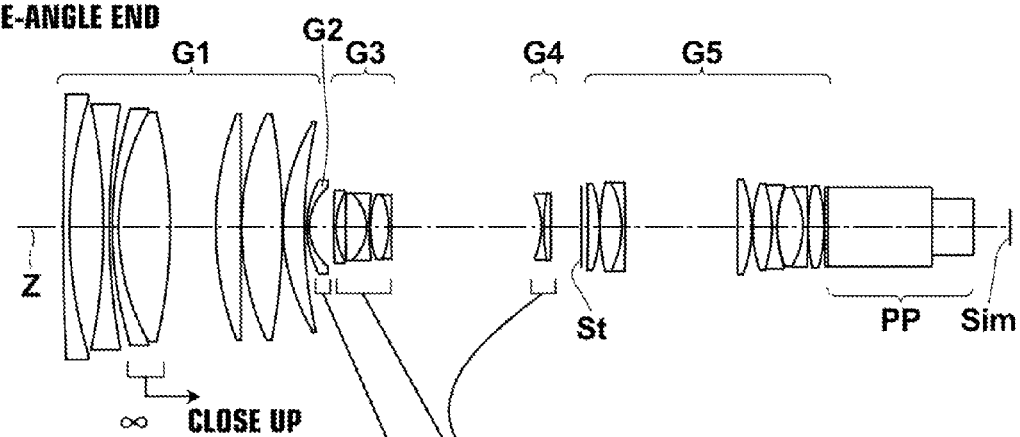
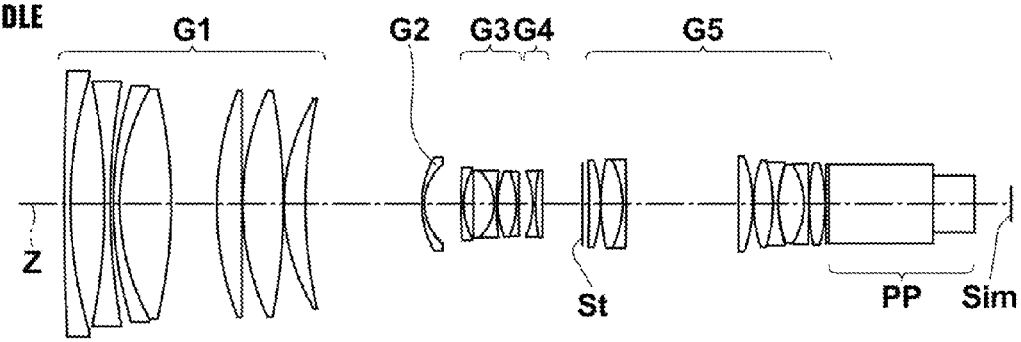
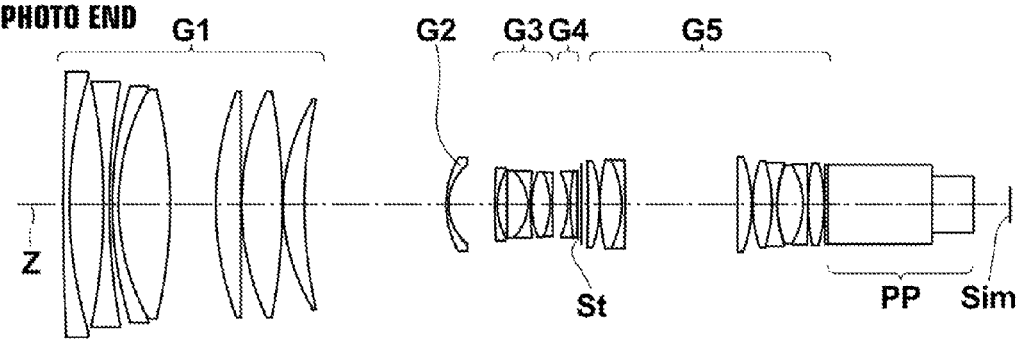

EXAMPLE 6 FIG.6
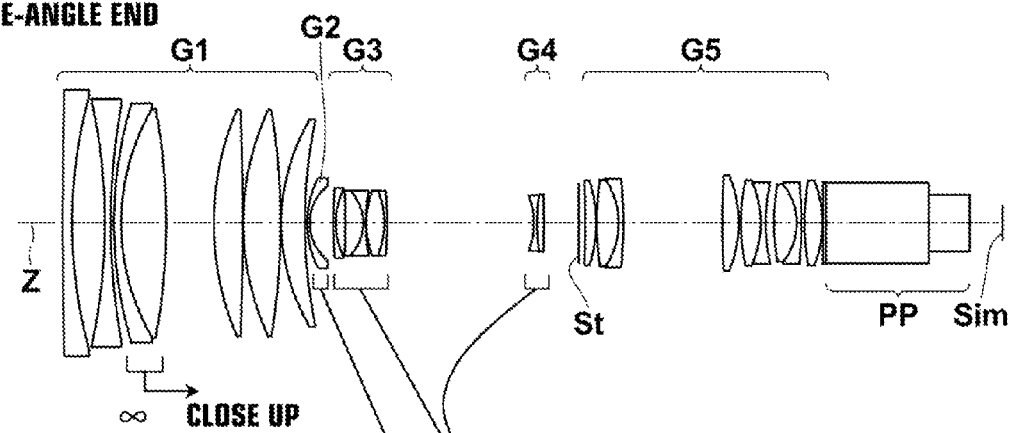
A WIDE-ANGLE END
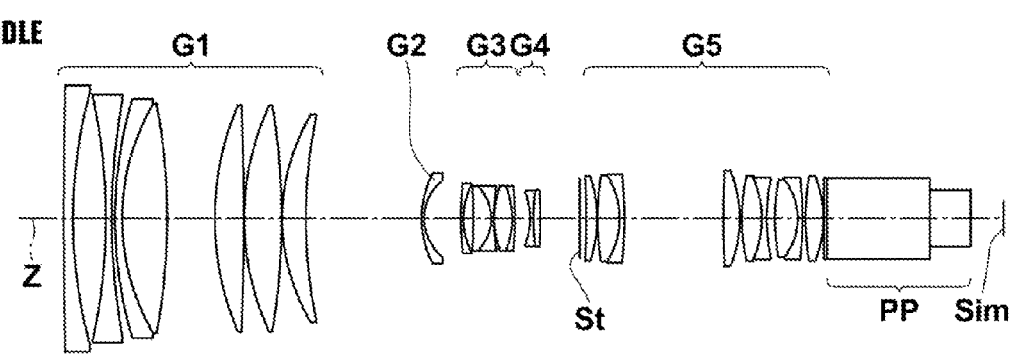
B MIDDLE
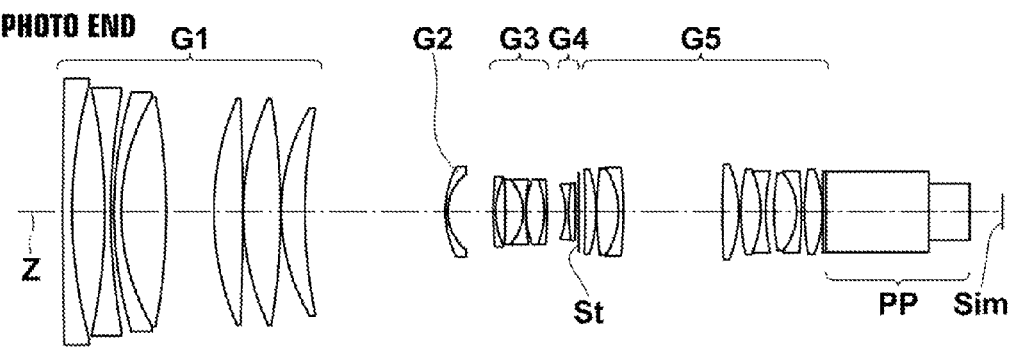
C TELEPHOTO END

FIG.7
EXAMPLE 1
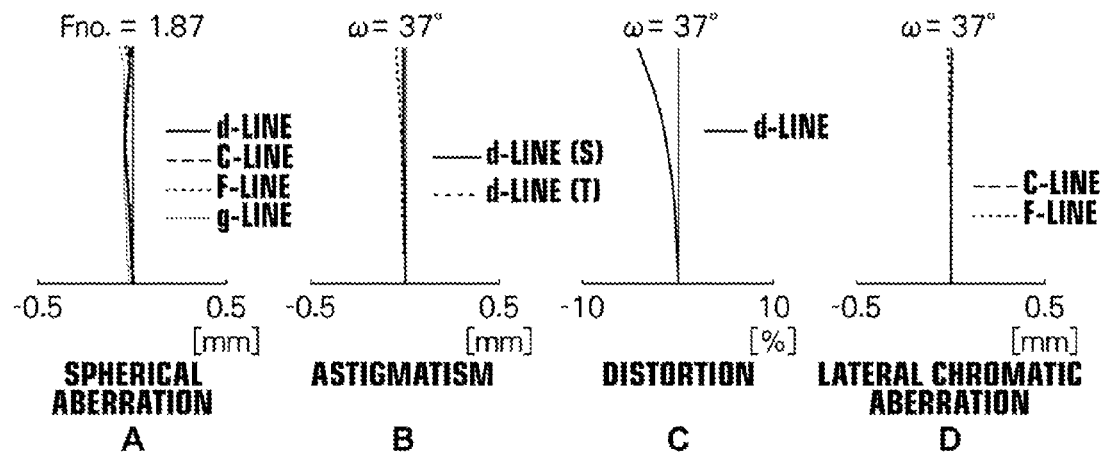
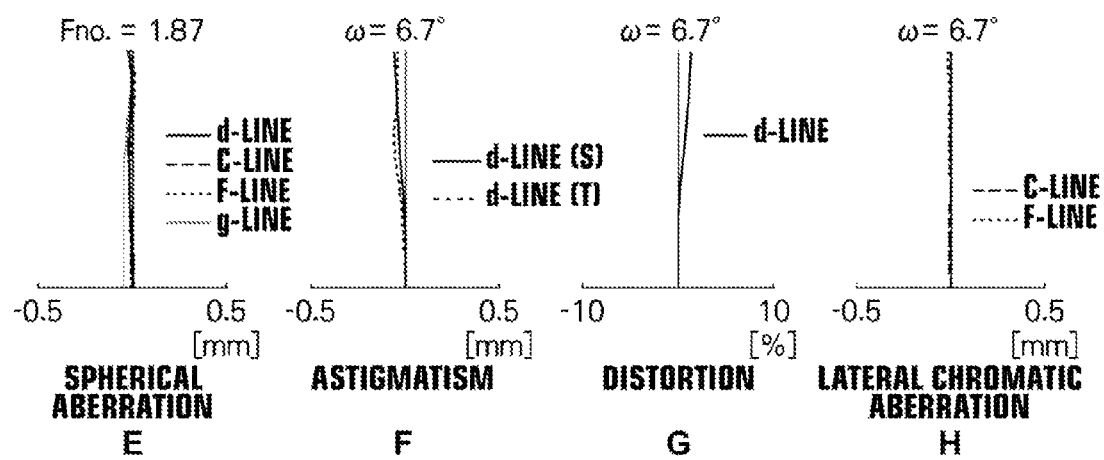
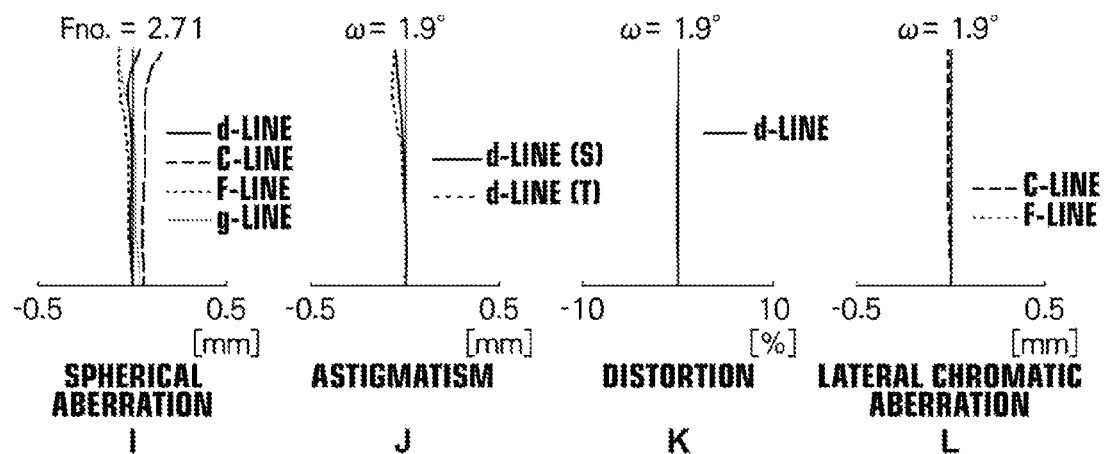

FIG.8
EXAMPLE 2
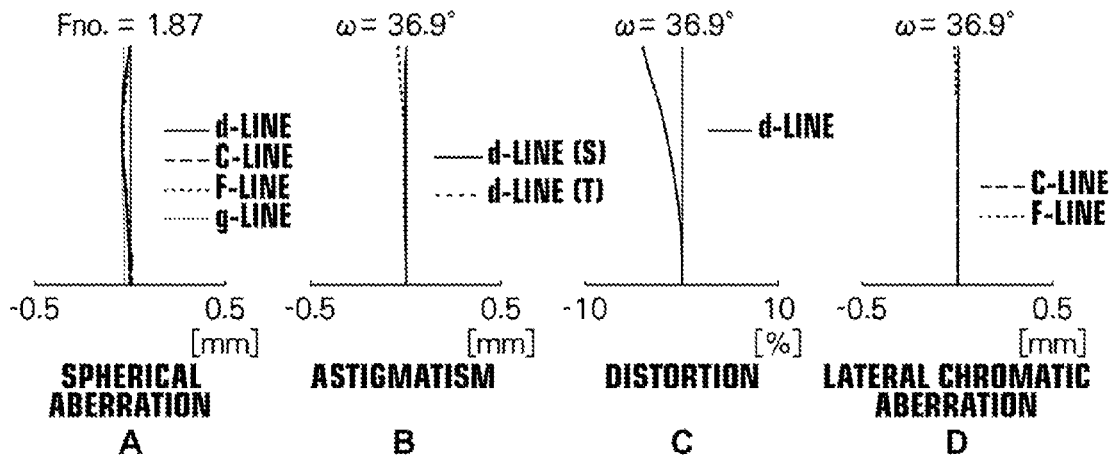
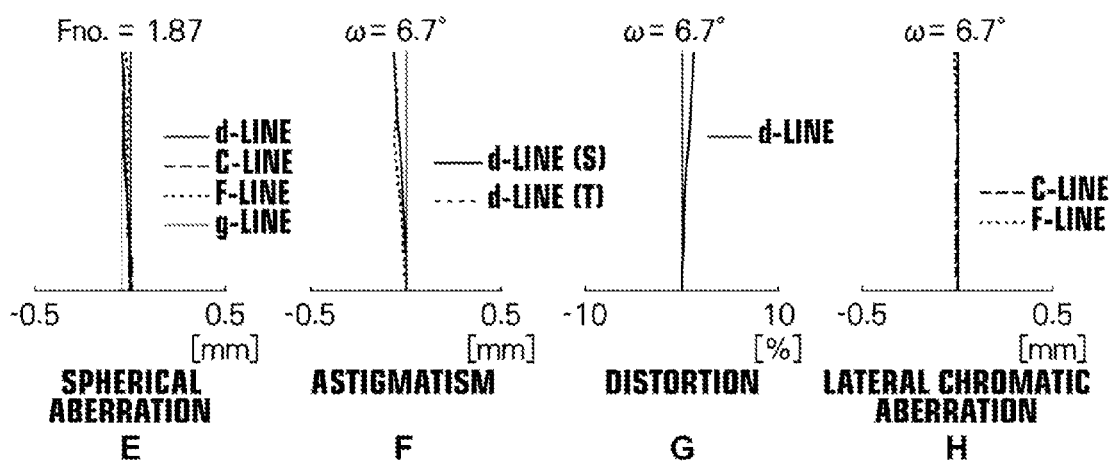
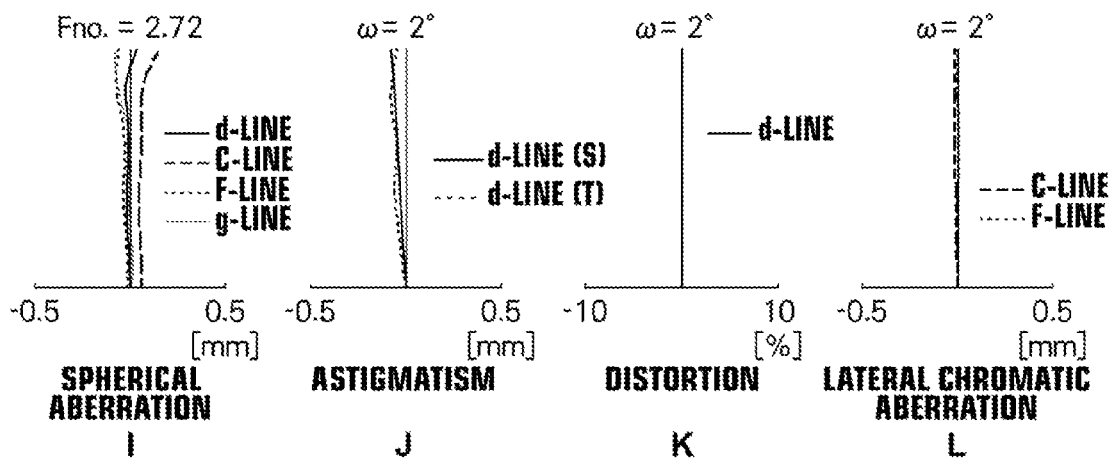

FIG.9
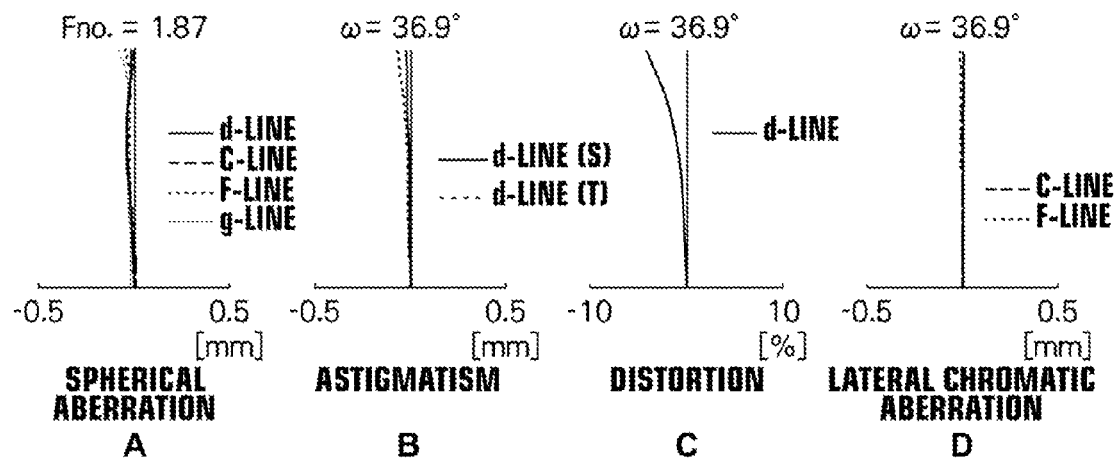
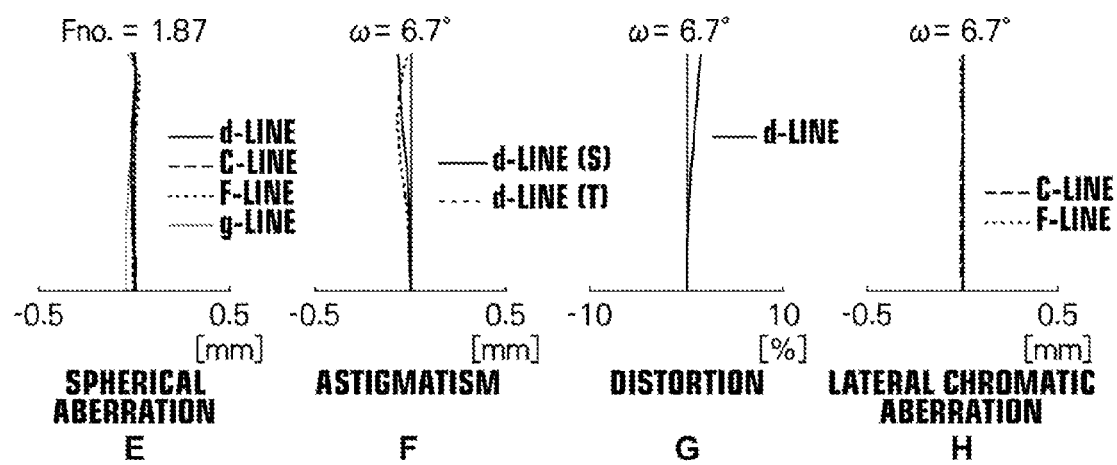
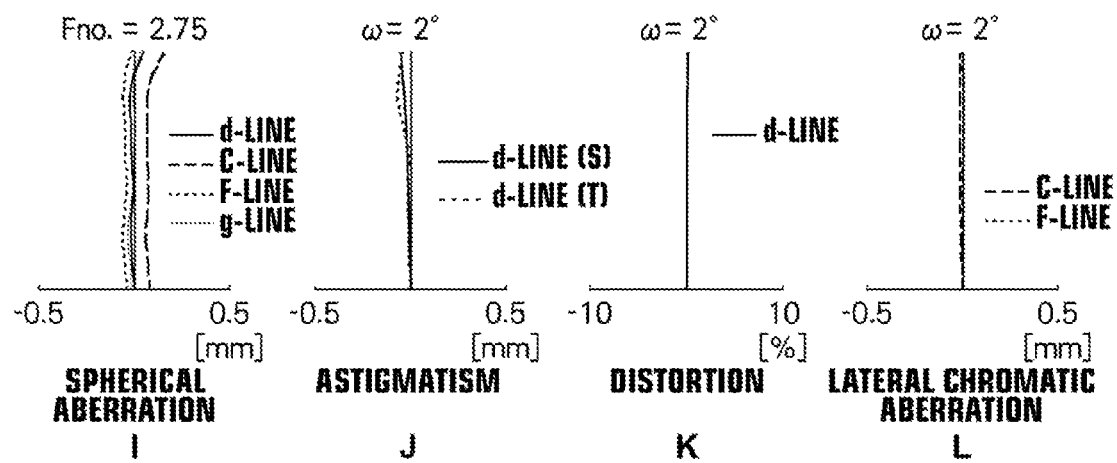

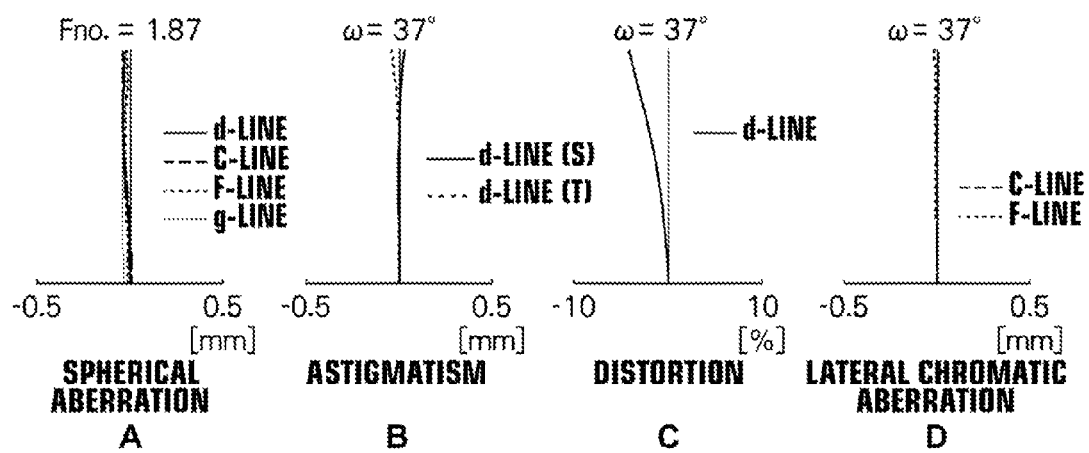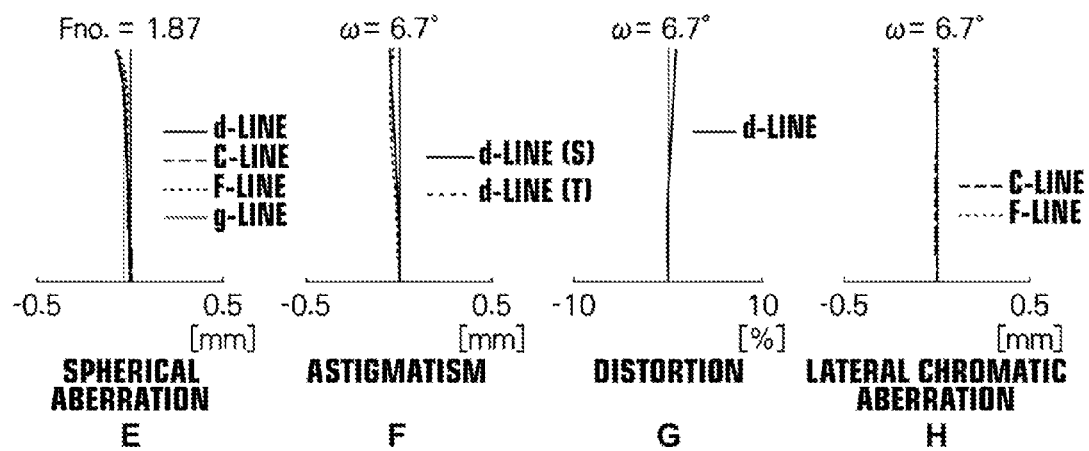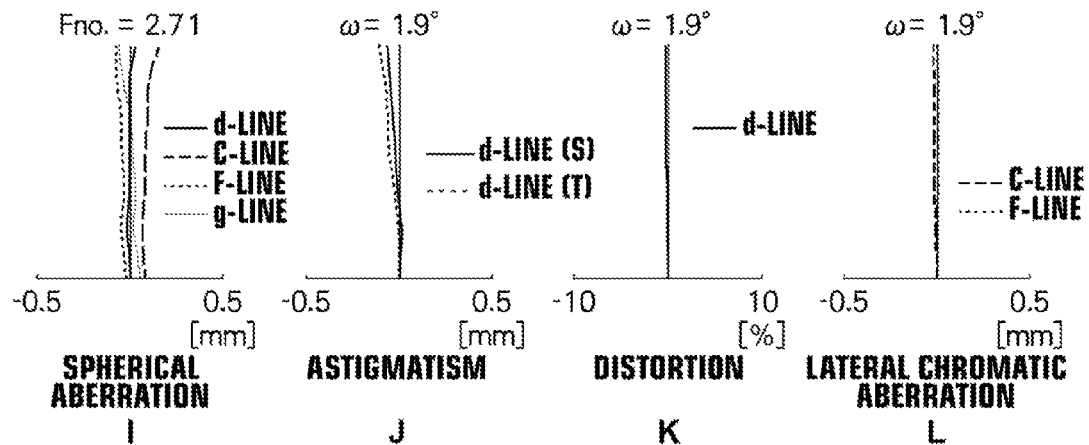
FIG.10 — EXAMPLE 4

FIG.11
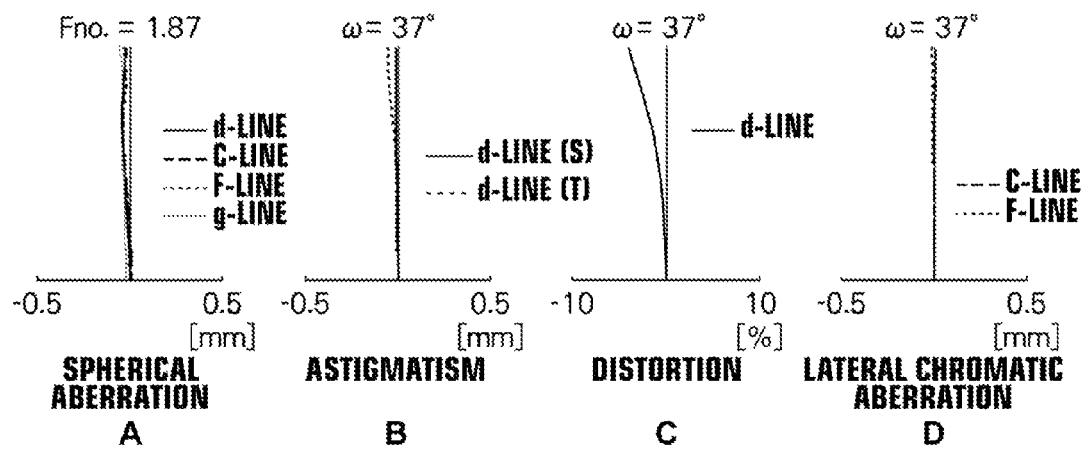
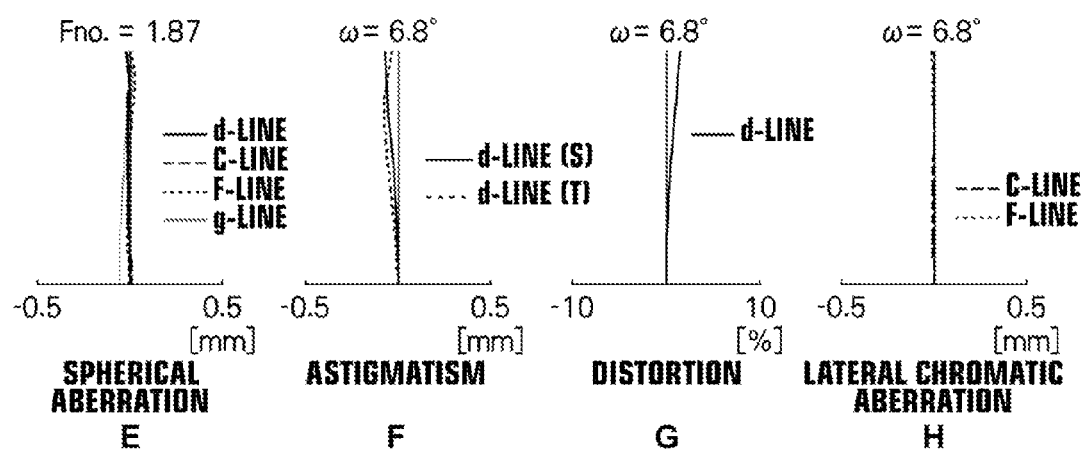
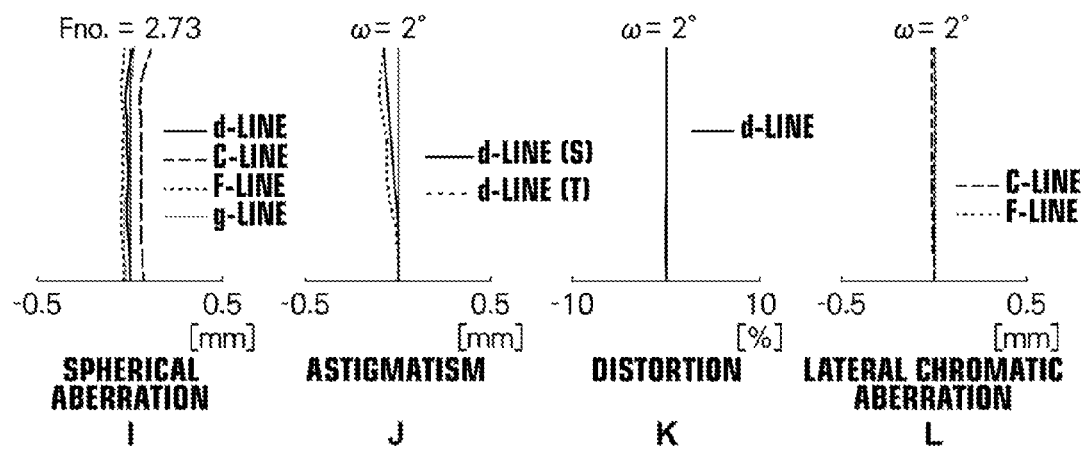

FIG.12
EXAMPLE 6
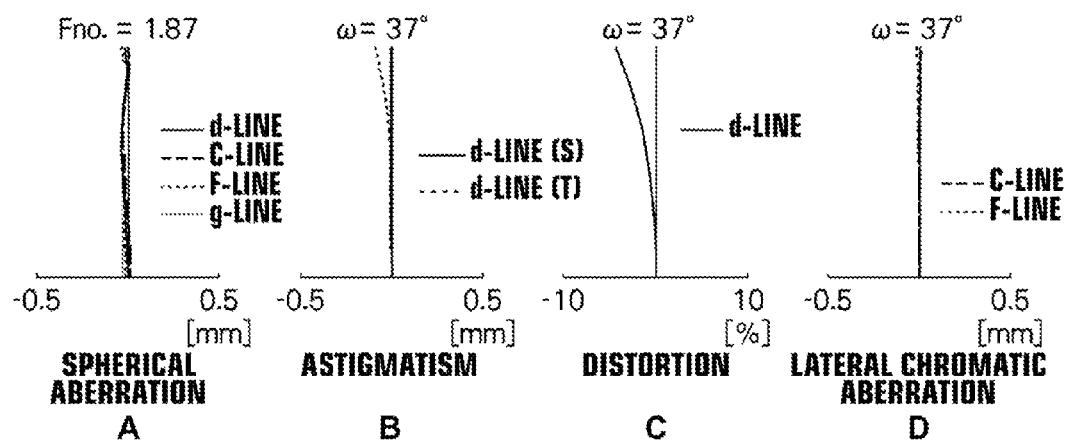
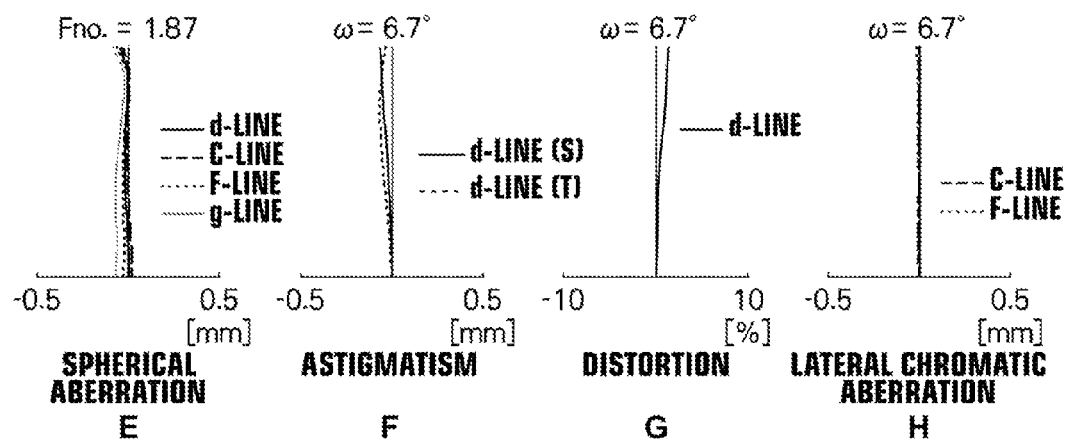
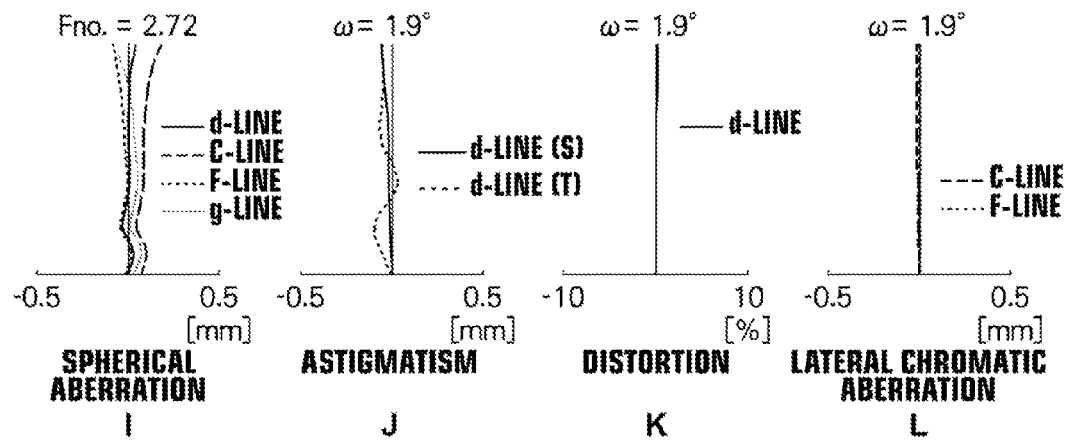

VARIABLE MAGNIFICATION OPTICAL SYSTEM AND IMAGING APPARATUS

CROSS REFERENCE TO RELATED APPLICATIONS

This application is a continuation of PCT/JP2012/005428 filed on Aug. 29, 2012, which claims foreign priority to Japanese Application No. 2011-187419 filed on Aug. 30, 2011. The entire contents of each of the above applications are hereby incorporated by reference

BACKGROUND OF THE INVENTION

1. Field of the Invention

The present invention relates to a variable magnification optical system and an imaging apparatus. In particular, the present invention relates to a variable magnification optical system usable in a video camera, an electronic still camera and the like, and appropriate especially for a surveillance camera, and also to an imaging apparatus including the variable magnification optical system.

2. Description of the Related Art

Conventionally, variable magnification optical systems for CCTV (Closed-circuit Television) were developed, as optical systems for imaging apparatuses, such as a video camera, an electronic still camera, and a surveillance camera, which use imaging devices, such as a CCD (Charge Coupled Device) and a CMOS (Complementary Metal Oxide Semiconductor), as recording media. As such variable magnification optical systems for CCTV, many optical systems with four group structure have been proposed, because they have many advantages, such as the simplicity of the lens barrel and variable magnification mechanisms and the easiness of handling (please refer, for example, to Japanese Unexamined Patent Publication No. 9(1997)-258102 (Patent Document 1), U.S. Pat. No. 6,512,637 (Patent Document 2), U.S. Patent Application Publication No. 20010019455 (Patent Document 3), Japanese Unexamined Patent Publication No. 2003-287678 (Patent Document 4), U.S. Patent Application Publication No. 20040042075 (Patent Document 5), Japanese Unexamined Patent Publication No. 2004-126631 (Patent Document 6), and Japanese Unexamined Patent Publication No. 2005-084409 (Patent Document 7)).

Further, although the structure of five-group optical systems is more complicated than the structure of four-group optical systems, many optical systems with five group structure have been also proposed to give excellent optical performance (please refer, for example, to U.S. Pat. No. 5,636,060 (Patent Document 8) and Japanese Unexamined Patent Publication No. 2011-081063 (Patent Document 9)).

SUMMARY OF THE INVENTION

In four-group variable magnification optical systems, as disclosed in Patent Documents 1 through 7, an optical system consists of a first lens group having positive refractive power, and which is fixed during magnification change, a second lens group having negative power, and which moves during magnification change, a third lens group having negative refractive power, and which moves during magnification change, and a fourth lens group having positive refractive power, and which is fixed during magnification change, which are in this order from an object side. If the magnification ratio of such an optical system is tried to be increased while its high optical performance is maintained, the outer diameter of the first lens group becomes large. Therefore, there is a drawback that the weight becomes heavy. On the contrary, if the size of such an optical system is tried to be reduced, the negative refractive power of the second lens group becomes too strong. Therefore, there is a drawback that the optical performance of the optical system becomes lower.

As a method for solving such problems, Patent Document 8 proposes a five-group variable magnification optical system consisting of a first lens group having positive refractive power, and which is fixed during magnification change, a second lens group having negative refractive power, and which moves during magnification change, a third lens group having negative refractive power, and which moves during magnification change, a fourth lens group having negative refractive power, and which moves during magnification change, and a fifth lens group having positive refractive power, and which is fixed during magnification change, which are in this order from the object side. In this variable magnification optical system, the second lens group in the aforementioned four-group variable magnification optical system is divided into lens groups. The divided lens groups become close to each other at a wide-angle end and at a telephoto end, and become away from each other in a middle variable magnification range. Many features are not clear because detailed lens data are not disclosed. However, since this lens structure does not have any difference from the structure of the conventional four-group variable magnification optical system at a wide-angle end and at a telephoto end. Therefore, it is impossible to solve the aforementioned problems.

Patent Document 9 discloses a variable magnification optical system with a high variable magnification ratio. However, the diameter of the first lens group is large, and the weight is heavy.

In view of the foregoing circumstances, it is an object of the present invention to provide a variable magnification optical system with excellent optical performance while the size of the optical system is small and the weight of the optical system is light, and an imaging apparatus including the variable magnification optical system.

A variable magnification optical system of the present invention substantially consists of:

a first lens group having positive refractive power, and which is fixed during magnification change;

a second lens group having negative refractive power;

a third lens group having negative refractive power;

a fourth lens group having negative refractive power; and a fifth lens group having positive refractive power, and which is fixed during magnification change, which are in this order from an object side. The second lens group, the third lens group and the fourth lens group move in such a manner that a distance between the first lens group and the second lens group constantly becomes longer and a distance between the second lens group and the third lens group constantly becomes longer, compared with a wide-angle end, and a distance between the third lens group and the fourth lens group changes and a distance between the fourth lens group and the fifth lens group changes when magnification is changed from the wide-angle end to a telephoto end.

It is desirable that the fourth lens group in the variable magnification optical system of the present invention temporarily moves toward the object side and reversely moves toward an image side when magnification is changed from the wide-angle end to the telephoto end.

Further, it is desirable that the distance between the third lens group and the fourth lens group in the variable magnification optical system of the present invention is the shortest when a focal length is closer to the wide-angle end than to the telephoto end during magnification change, and that the distance at the wide-angle end is longer than the distance at the telephoto end.

It is desirable that the first lens group in the variable magnification optical system of the present invention substantially consists of a 1f-th lens group having negative refractive power, and which substantially consists of two negative lenses, a 1m-th lens group having positive refractive power and a 1r-th lens group having positive refractive power, which are in this order from the object side, and that focusing is performed by moving the 1m-th lens group in the direction of an optical axis.

In this case, it is desirable that the 1m-th lens group is a cemented lens substantially consisting of a concave meniscus lens with its convex surface facing the object side and a biconvex lens, which are in this order from the object side.

In the variable magnification optical system of the present invention, it is desirable that the following conditional formula (1) is satisfied when the focal length of the second lens group is f2 and the focal length of the third lens group is f3:

$$0.10 < f2/f3 < 2.00 \qquad (1).$$

Further, it is desirable that the second lens group in the variable magnification optical system of the present invention substantially consists of only a concave meniscus lens with its convex surface facing the object side.

In this case, it is desirable that the following conditional formula (2) is satisfied when the refractive index of the concave meniscus lens is LN2:

$$2.0 \leq LN2 \qquad (2).$$

Here, the sign of the refractive power and the surface shape of each of the aforementioned lenses are considered in a paraxial region when the lens is an aspherical lens.

In the above descriptions, the number of lenses is the number of lenses, as composition elements. For example, when plural single lenses made of different materials from each other are cemented together to form a cemented lens, the number of the single lenses constituting the cemented lens is counted.

Further, the term "convex meniscus lens" refers to a meniscus lens having positive refractive power. The term "concave meniscus lens" refers to a meniscus lens having negative refractive power.

The imaging apparatus of the present invention includes the variable magnification optical system of the present invention, as described above.

The variable magnification optical system of the present invention substantially consists of a first lens group having positive refractive power, and which is fixed during magnification change, a second lens group having negative refractive power, a third lens group having negative refractive power, a fourth lens group having negative refractive power, and a fifth lens group having positive refractive power, and which is fixed during magnification change, which are in this order from an object side. Further, the second lens group, the third lens group and the fourth lens group move in such a manner that a distance between the first lens group and the second lens group constantly becomes longer and a distance between the second lens group and the third lens group constantly becomes longer, compared with a wide-angle end, and a distance between the third lens group and the fourth lens group changes and a distance between the fourth lens group and the fifth lens group changes when magnification is changed from the wide-angle end to a telephoto end. Therefore, it is possible to achieve excellent optical performance while the size of the optical system is small and the weight of the optical system is light.

The imaging apparatus of the present invention includes the variable magnification optical system of the present invention. Therefore, it is possible to obtain images with high image qualities while the size of the imaging apparatus is small and the weight of the imaging apparatus is light.

BRIEF DESCRIPTION OF THE DRAWINGS

FIG. 1, Sections A through C are cross sections illustrating the lens structure of a variable magnification optical system according to an embodiment of the present invention (also Example 1);

FIG. 2, Sections A through C are cross sections illustrating the lens structure of a variable magnification optical system in Example 2 of the present invention;

FIG. 3, Sections A through C are cross sections illustrating the lens structure of a variable magnification optical system in Example 3 of the present invention;

FIG. 4, Sections A through C are cross sections illustrating the lens structure of a variable magnification optical system in Example 4 of the present invention;

FIG. 5, Sections A through C are cross sections illustrating the lens structure of a variable magnification optical system in Example 5 of the present invention;

FIG. 6, Sections A through C are cross sections illustrating the lens structure of a variable magnification optical system in Example 6 of the present invention;

FIG. 7, Sections A through L are aberration diagrams of the variable magnification optical system in Example 1 of the present invention;

FIG. 8, Sections A through L are aberration diagrams of the variable magnification optical system in Example 2 of the present invention;

FIG. 9, Sections A through L are aberration diagrams of the variable magnification optical system in Example 3 of the present invention;

FIG. 10, Sections A through L are aberration diagrams of the variable magnification optical system in Example 4 of the present invention;

FIG. 11, Sections A through L are aberration diagrams of the variable magnification optical system in Example 5 of the present invention;

FIG. 12, Sections A through L are aberration diagrams of the variable magnification optical system in Example 6 of the present invention.

DESCRIPTION OF THE PREFERRED EMBODIMENTS

Figure 13:
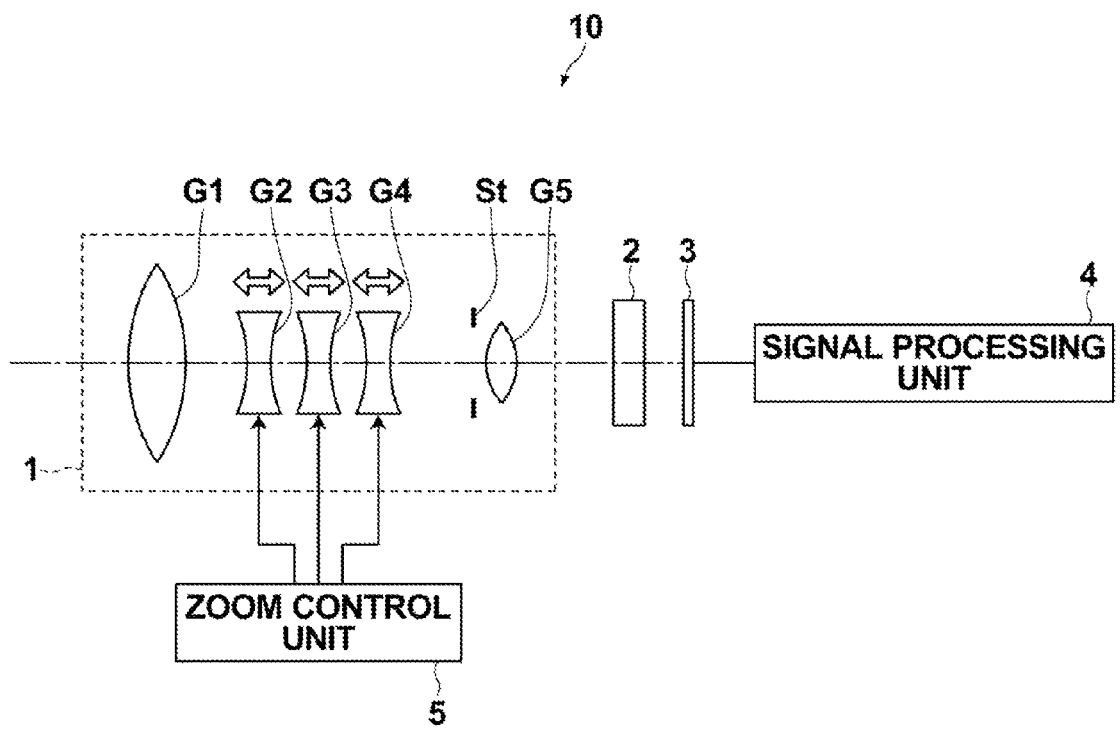
FIG. 13 is a schematic diagram illustrating the configuration of an imaging apparatus according to an embodiment of the present invention.

Embodiments of the present invention will be described in detail with reference to drawings. FIG. 1, Sections A through C illustrate cross sections of a structure example of a variable magnification optical system according to an embodiment of the present invention. The structure example illustrated in FIG. 1, Sections A through C is common to the embodiment and a variable magnification optical system in Example 1, which will be described later. In FIG. 1, Sections A through C, the left side is the object side, and the right side is the image side.

This variable magnification optical system consists of first lens group G1 having positive refractive power, and which is fixed during magnification change, second lens group G2 having negative refractive power, third lens group G3 having negative refractive power, fourth lens group G4 having negative refractive power, aperture stop St, which is fixed during magnification change, and fifth lens group G5 having positive refractive power, and which is fixed during magnification change, which are in this order from an object side along optical axis Z. Further, second lens group G2, third lens group G3 and fourth lens group G4 move in such a manner that a distance between first lens group G1 and second lens group G2 constantly becomes longer and a distance between second lens group G2 and third lens group G3 constantly becomes longer, compared with a wide-angle end, and a distance between third lens group G3 and fourth lens group G4 changes and a distance between fourth lens group G4 and fifth lens group G5 changes when magnification is changed from the wide-angle end to a telephoto end. Here, aperture stop St illustrated in FIG. 1 does not necessarily represent the size nor the shape of aperture stop St, but the position of aperture stop St on optical axis Z.

When this variable magnification optical system is applied to an imaging apparatus, it is desirable to arrange a cover glass, a prism, and various filters, such as an infrared ray cut filter and a low-pass filter, between the optical system and image plane Sim based on the structure of the camera side on which the lens is mounted. Therefore, FIG. 1 illustrates an example in which parallel-flat-plate-shaped optical members PP1 and PP2, which are assumed to be such elements, are arranged between fifth lens group G5 and image plane Sim.

In conventional four-group variable magnification optical systems, as disclosed in Patent Documents 1 through 7, an optical system consists of a first lens group having positive refractive power, and which is fixed during magnification change, a second lens group having negative power, and which moves during magnification change, a third lens group having negative refractive power, and which moves during magnification change, and a fourth lens group having positive refractive power, and which is fixed during magnification change, which are in this order from an object side. If the magnification ratio of such an optical system is tried to be increased while its high optical performance is maintained, the outer diameter of the first lens group becomes large. Therefore, there is a drawback that the weight becomes heavy. On the contrary, if the size of such an optical system is tried to be reduced, the negative refractive power of the second lens group becomes too strong. Therefore, there is a drawback that the optical performance of the optical system becomes lower.

As a method for solving such problems, Patent Document 8 proposes a five-group variable magnification optical system consisting of a first lens group having positive refractive power, and which is fixed during magnification change, a second lens group having negative refractive power, and which moves during magnification change, a third lens group having negative refractive power, and which moves during magnification change, a fourth lens group having negative refractive power, and which moves during magnification change, and a fifth lens group having positive refractive power, and which is fixed during magnification change, which are in this order from the object side. In this variable magnification optical system, the second lens group in the aforementioned four-group variable magnification optical system is divided into lens groups, and the divided lens groups become close to each other at a wide-angle end and at a telephoto end, and become away from each other in a middle variable magnification range. Many features are not clear because detailed lens data are not disclosed. However, since this lens structure does not have any difference from the structure of the conventional four-group variable magnification optical system at a wide-angle end and at a telephoto end. Therefore, it is impossible to solve the aforementioned problems. It is conceivable that the main purpose of Patent Document 8 is to improve its performance in the middle variable magnification range.

In Patent Document 9, a second lens group in the aforementioned four-group variable magnification optical system is divided into lens groups, and a distance between the divided lens groups becomes the shortest when a variable magnification position is closer to the telephoto end than to the wide-angle end during magnification change. It is conceivable that the main purpose of this structure is to obtain a high variable magnification ratio. The diameter of a first lens group remains large, and the weight remains heavy.

In the variable magnification optical system according to an embodiment of the present invention, the feature of dividing the second lens group in the four-group variable magnification optical system into lens groups is similar. However, when magnification is changed from a wide-angle end to a telephoto end, a distance between the divided lens groups (second lens group G2 and third lens group G3 in the five-group variable magnification optical system) constantly increases, compared with the wide-angle end, and this feature is different. This structure can suppress a spherical aberration, which tends to be excessively corrected especially on the telephoto side when a magnification ratio is increased while the small size is maintained.

When magnification is changed, if second lens group G2 and third lens group G3 are moved while first lens group G1 and fifth lens group G5 are fixed with respect to an image plane, a focal position fluctuates. To correct such movement of the focal point, fourth lens group G4 in the variable magnification optical system according to an embodiment of the present invention temporarily moves toward the object side and reversely moves toward the image side when magnification is changed from a wide-angle end to a telephoto end.

Further, a distance between third lens group G3 and fourth lens group G4 in the variable magnification optical system according to an embodiment of the present invention is the shortest when a focal length is closer to the wide-angle end than to the telephoto end during magnification change, and the distance at the wide-angle end is longer than the distance at the telephoto end. Therefore, it is possible to suppress a fluctuation of curvature of field in a middle variable magnification range.

Further, the variable magnification optical system according to an embodiment of the present invention satisfies the following conditional formula (1) when the focal length of a second lens group is f2, and the focal length of a third lens group is f3. If the value is lower than the lower limit of conditional formula (1), the refractive power of second lens group G2 becomes too strong, and astigmatism mainly at a wide-angle end and distortion become worse. On the contrary, if the value exceeds the upper limit of conditional formula (1), the refractive power of third lens group G3 becomes too strong, and a spherical aberration at a telephoto end becomes worse.

$$0.10 < f2/f3 < 2.00 \qquad (1)$$

Further, second lens group G2 of the variable magnification optical system according to an embodiment of the present invention consists of only concave meniscus lens L8 with its convex surface facing the object side. Therefore, it is possible to suppress the diameter of first lens group G1 to be small while the total length of the lens is minimized by minimizing the lens length of second lens group G2.

Here, when the refractive index of concave meniscus lens L8 is LN2, the following conditional formula (2) is satisfied. When conditional formula (2) is satisfied, it is possible to reduce the curvature of concave meniscus lens L8, and to suppress an increase of a spherical aberration at a telephoto end.

$$2.0 \leq LN2 \tag{2}$$

Further, the first lens group in the variable magnification optical system according to an embodiment of the present invention consists of 1f-th lens group G1f having negative refractive power, and which consists of two negative lenses L1 and L2, 1m-th lens group G1m having positive refractive power and 1r-th lens group G1r having positive refractive power, which are in this order from the object side, and focusing is performed by moving 1m-th lens group G1m in the direction of an optical axis. This structure can suppress a fluctuation of the height of rays caused by focusing. Therefore, it is possible to reduce the closest distance of focus. Further, it is possible to suppress a change in the imaging range caused by focusing.

Here, 1f-th lens group G1f consists of concave meniscus lens L1 with its convex surface facing the object side and negative lens L2, which are in this order from the object side. This structure can prevent distortion on the wide-angle side from becoming worse, and suppress a high-order spherical aberration at a telephoto end.

Further, 1m-th lens group G1m is a cemented lens consisting of concave meniscus lens L3 with its convex surface facing the object side and biconvex lens L4, which are in this order from the object side. This structure can suppress fluctuation of various aberrations during focusing while the weight of a focusing lens is suppressed to be light.

Further, 1r-th lens group G1r consists of positive 1r1-th lens L5 with its strong convex surface facing the object side, biconvex 1r2-th lens L6, and convex meniscus 1r3-th lens L7 with its convex surface facing the object side, which are in this order from the object side. This structure of 1r-th lens group G1r can suppress fluctuations of a spherical aberration and astigmatism during magnification change.

Further, when the average refractive index of positive 1r1-th lens L5 and biconvex 1r2-th lens L6 is N1r12, and the average Abbe number of positive 1r1-th lens L5 and biconvex 1r2-th lens L6 is ν1r12, and the refractive index of 1r3-th lens L7 is N1r3, and the Abbe number of 1r3-th lens L7 is ν1r3, the following conditional formula (3) is satisfied. If the value is lower than the lower limit of conditional formula (3), it becomes difficult to suppress astigmatism in a peripheral area at a wide-angle end.

$$0.20 < N1r3 - N1r12 \tag{3}$$

Further, when the average refractive index of positive 1r1-th lens L5 and biconvex 1r2-th lens L6 is N1r12, and the average Abbe number of positive 1r1-th lens L5 and biconvex 1r2-th lens L6 is ν1r12, and the refractive index of 1r3-th lens L7 is N1r3, and the Abbe number of 1r3-th lens L7 is ν1r3, the following conditional formula (4) is satisfied. If the value is lower than the lower limit of conditional formula (4), it becomes difficult to balance a lateral chromatic aberration in a middle angle of view and a lateral chromatic aberration in a peripheral angle of view at a wide-angle end.

$$20 < \nu1r12 - \nu1r3 \tag{4}$$

Further, each of 1f-th lens group G1f and 1r-th lens group G1r includes at least an aspherical surface. When an aspherical surface is used in 1f-th lens group G1f, it is possible to prevent an increase of distortion at a wide-angle end. When an aspherical surface is used in 1r-th lens group G1r, it is possible to suppress a spherical aberration at a telephoto end.

It is more desirable that the variable magnification optical system according to an embodiment of the present invention satisfies the following conditional formulas (1-1), (3-1) and (4-1) instead of the aforementioned conditional formulas (1), (3) and (4), respectively. When conditional formulas (1-1), (3-1) and (4-1) are satisfied, it is possible to further enhance the effects achievable by satisfying conditional formulas (1), (3) and (4), respectively. As a desirable mode, it is not always necessary that all of conditional formulas (1-1), (3-1) and (4-1) are satisfied at the same time. One of conditional formulas (1-1), (3-1) and (4-1), or an arbitrary combination of them should be satisfied.

$$0.20 < f2/f3 < 1.60 \tag{1-1}$$

$$0.29 < N1r3 - N1r12 \tag{3-1}$$

$$40 < \nu1r12 - \nu1r3 \tag{4-1}$$

In the variable magnification optical system according to an embodiment of the present invention, it is desirable that glass is used as a specific material arranged on the most object-side. Alternatively, a transparent ceramic may be used.

As the material of a lens on which an aspherical shape is formed, glass may be used. Alternatively, plastic may be used. When plastic is used, it is possible to reduce the weight and the cost of the lens.

When the variable magnification optical system according to an embodiment of the present embodiment is used in tough conditions, it is desirable that a multi-layer coating for protection is applied. Besides the coating for protection, an anti-reflection coating for reducing ghost light or the like in usage may be applied.

In the example illustrated in FIG. 1, optical members PP1 and PP2 are arranged between the lens system and image plane Sim. Instead of arranging various filters, such as a low-pass filter and a filter that cuts a specific wavelength band, or the like, the various filters may be arranged between lenses. Alternatively, a coating having similar action to that of various filters may be applied to a lens surface of one of the lenses.

Next, numerical value examples of the variable magnification optical system of the present invention will be described. FIG. 1, Sections A, B and C illustrate arrangement of lenses of the variable magnification optical system in Example 1 at a wide-angle end, in a middle focal length state and at a telephoto end, respectively. In FIG. 1, Sections A through C, optical member PP is also illustrated, and the left side is the object side, and the right side is the image side. The illustrated aperture stop St does not necessarily represent the size nor the shape of aperture stop St, but represents the position of aperture stop St on optical axis Z.

Similarly, FIG. 2, Sections A, B and C illustrate arrangement of lenses of the variable magnification optical system in Example 2 at a wide-angle end, in a middle focal length state, and at a telephoto end, respectively. FIG. 3, Sections A, B and C illustrate arrangement of lenses of the variable magnification optical system in Example 3 at a wide-angle end, in a middle focal length state, and at a telephoto end, respectively. FIG. 4, Sections A, B and C illustrate arrangement of lenses of the variable magnification optical system in Example 4 at a wide-angle end, in a middle focal length state, and at a telephoto end, respectively. FIG. 5, Sections A, B and C illustrate arrangement of lenses of the variable magnification optical system in Example 5 at a wide-angle end, in a middle focal length state, and at a telephoto end, respectively. FIG. 6, Sections A, B and C illustrate arrangement of lenses of the variable magnification optical system in Example 6 at a wide-angle end, in a middle focal length state, and at a telephoto end, respectively.

Table 1 shows basic lens data about a variable magnification optical system in Example 1, and Table 2 shows data about variable magnification. Table 3 shows data about focus, and Table 4 and Table 5 show aspherical surface data. Similarly, Table 6 through Table 30 show basic lens data, data about variable magnification, data about focus and aspherical surface data of variable magnification optical systems in Examples 2 through 6. Next, the meanings of signs in the tables will be described, using the tables of Example 1 as an example. The meaning of the signs in the tables of Examples 2 through 6 is basically similar to Example 1.

In the basic lens data of Table 1, the column of Si shows the surface numbers of i-th (i=1, 2, 3, ... ) surfaces. The surface number of the most object-side surface of elements is the first surface, and the surface numbers sequentially increase toward the image side. The column of Ri shows the curvature radius of the i-th surface. The column of Di shows a distance, on optical axis Z, between the i-th surface and the (i+1)th surface. The column of Ndi shows the refractive index of a medium between the i-th surface and the (i+1)th surface for d-line (wavelength is 587.6 nm), and the column of vdj shows the Abbe number of the j-th (j=1, 2, 3, ... ) optical element for d-line when the most object-side optical element is the first optical element, and the value of j sequentially increases toward the image side. Further, the column of θg, f shows partial dispersion ratio of each optical element.

The sign of a curvature radius is positive when the shape of a surface is convex toward the object side, and negative when the shape of a surface is convex toward the image side. The basic lens data include aperture stop St and optical member PP. In the column of surface numbers, the term "(STOP)" is written for a surface corresponding to aperture stop St together with the surface number.

In the basic lens data of Table 1, "DD[SURFACE NUMBER]" is written in each row of a surface distance that changes during magnification change. "DD [4]" is a distance between 1f-th lens group G1f and 1m-th lens group G1m, and "DD [7]" is a distance between 1m-th lens group G1m and 1r-th lens group G1r, and "DD[13]" is a distance between first lens group G1 and second lens group G2. "DD[15]" is a distance between second lens group G2 and third lens group G3, and "DD[23]" is a distance between third lens group G3 and fourth lens group G4, and "DD[26]" is a distance between fourth lens group G4 and aperture stop St.

Data about variable magnification in Table 2 show a zoom magnification ratio (variable magnification ratio), focal length f, back focus Bf (distance in air), F-number Fno., full angle of view 2ω and values of DD [13], DD [15], DD [23] and DD [26] at a wide-angle end, in a middle focal length state and at a telephoto end.

Data about focus in Table 3 show values of DD [4] and DD [7] at a wide-angle end, in a middle focal length state and at a telephoto end.

In the basic lens data, the data about variable magnification and the data about focus, degree is used as the unit of angle, and mm is used as the unit of length. However, since an optical system can be used by proportionally enlarging or reducing the optical system, other appropriate units may be used.

In the basic lens data of Table 1, mark * is attached to the surface number of an aspherical surface. Table 1 shows, as the curvature radius of the aspherical surface, the numerical value of a paraxial curvature radius. The aspherical surface data in Table 4 and Table 5 show surface numbers Si of aspherical surfaces and aspheric coefficients about the aspherical surfaces. The aspheric coefficients are values of coefficients KA and Am (m=3, 4, 5 ... 16) in an aspherical equation represented by the following equation (A):

$$Zd = C \cdot h^2 / \{1 + (1 - KA \cdot C^2 \cdot h^2)^{1/2}\} + \Sigma Am \cdot h^m \quad \text{(A)}$$

where

Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: the reciprocal of paraxial curvature radius, and KA, Am: aspheric coefficients (m=3, 4, 5 ... 16).

TABLE 1

EXAMPLE 1 • BASIC LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | θ g, f (PARTIAL DISPERSION RATIO) |
|---|---|---|---|---|---|
| *1 | 671.7741 | 3.00 | 1.772499 | 49.60 | 0.55212 |
| 2 | 134.8384 | 11.75 | | | |
| 3 | −163.3426 | 1.90 | 1.799516 | 42.22 | 0.56727 |
| 4 | 210.1574 | DD[4] | | | |
| 5 | 139.4639 | 2.30 | 1.800000 | 29.84 | 0.60178 |
| 6 | 73.4230 | 15.03 | 1.496999 | 81.54 | 0.53748 |
| 7 | −176.7451 | DD[7] | | | |
| 8 | 98.0153 | 8.34 | 1.433871 | 95.20 | 0.53733 |
| 9 | −1700.9952 | 0.20 | | | |
| 10 | 91.1102 | 12.24 | 1.433871 | 95.20 | 0.53733 |
| 11 | −181.3469 | 0.20 | | | |
| *12 | 59.3608 | 7.58 | 1.772499 | 49.60 | 0.55212 |
| 13 | 144.5405 | DD[13] | | | |
| 14 | 30.0623 | 0.90 | 2.001003 | 29.13 | 0.59952 |
| 15 | 15.1723 | DD[15] | | | |
| 16 | 116.7085 | 0.80 | 1.882997 | 40.76 | 0.56679 |
| 17 | 25.2660 | 3.11 | | | |
| 18 | −211.5945 | 6.25 | 1.808095 | 22.76 | 0.63073 |
| 19 | −14.3520 | 0.80 | 1.816000 | 46.62 | 0.55682 |
| 20 | 92.0752 | 0.17 | | | |
| 21 | 29.5030 | 5.51 | 1.658441 | 50.88 | 0.55612 |

TABLE 1-continued

EXAMPLE 1 • BASIC LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | θ g, f (PARTIAL DISPERSION RATIO) |
|---|---|---|---|---|---|
| 22 | −29.5030 | 0.90 | 1.882997 | 40.76 | 0.56679 |
| 23 | −546.6046 | DD[23] | | | |
| 24 | −25.8345 | 1.00 | 1.743997 | 44.78 | 0.56560 |
| 25 | 53.6380 | 2.46 | 1.922860 | 18.90 | 0.64960 |
| 26 | −868.6198 | DD[26] | | | |
| 27 (STOP) | ∞ | 2.15 | | | |
| 28 | ∞ | 3.80 | 1.882997 | 40.76 | 0.56679 |
| 29 | −47.2624 | 0.13 | | | |
| 30 | 75.9172 | 7.14 | 1.583126 | 59.38 | 0.54345 |
| 31 | −27.8250 | 1.50 | 1.804000 | 46.58 | 0.55730 |
| 32 | −253.3002 | 31.47 | | | |
| 33 | 417.3315 | 4.82 | 1.696797 | 55.53 | 0.54341 |
| 34 | −43.5643 | 0.30 | | | |
| 35 | 41.4240 | 6.32 | 1.487490 | 70.23 | 0.53007 |
| 36 | −41.4240 | 1.60 | 1.882997 | 40.76 | 0.56679 |
| 37 | 33.7835 | 2.40 | | | |
| 38 | 34.1563 | 8.35 | 1.496999 | 81.54 | 0.53748 |
| 39 | −22.4200 | 1.50 | 1.806100 | 33.27 | 0.58845 |
| 40 | −244.3828 | 0.12 | | | |
| 41 | 75.8080 | 5.36 | 1.567322 | 42.82 | 0.57309 |
| 42 | −39.8974 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 11.68 | | | |

TABLE 2

EXAMPLE 1 • DATA ABOUT VARIABLE MAGNIFICATION

| | WIDE-ANGLE END | MIDDLE | TELEPHOTO END |
|---|---|---|---|
| ZOOM MAGNIFICATION RATIO | 1.0 | 5.7 | 18.2 |
| f | 7.62 | 43.46 | 138.77 |
| Bf | 40.90 | 40.90 | 40.90 |
| FNo. | 1.87 | 1.87 | 2.71 |
| 2ω[°] | 74.64 | 14.22 | 4.53 |
| DD[13] | 0.80 | 37.85 | 46.09 |
| DD[15] | 7.68 | 11.68 | 14.68 |
| DD[23] | 49.52 | 5.74 | 5.56 |
| DD[26] | 9.60 | 12.33 | 1.27 |

TABLE 3

EXAMPLE 1 • DATA ABOUT FOCUS

| | inf | 3m | 0.55m |
|---|---|---|---|
| DD[4] | 1.01 | 3.83 | 14.49 |
| DD[7] | 14.08 | 11.27 | 0.60 |

TABLE 4

EXAMPLE 1 • ASPHERICAL SURFACE DATA(1)

| SURFACE NUMBER | 1 |
|---|---|
| KA | −1.144658E+02 |
| A3 | 1.266635E−06 |
| A4 | −7.680904E−07 |
| A5 | 1.835455E−07 |
| A6 | −1.799087E−08 |
| A7 | 1.017818E−09 |
| A8 | −3.276256E−11 |
| A9 | 5.233524E−13 |
| A10 | −6.219345E−15 |
| A11 | 4.254304E−16 |
| A12 | −1.872576E−17 |
| A13 | 3.233753E−19 |
| A14 | −7.119809E−22 |
| A15 | −4.166246E−23 |
| A16 | 3.616030E−25 |

TABLE 5

EXAMPLE 1 • ASPHERICAL SURFACE DATA(2)

| SURFACE NUMBER | 12 |
|---|---|
| KA | 9.454836E−01 |
| A3 | −4.681704E−07 |
| A4 | −8.801168E−08 |
| A5 | −2.733358E−08 |
| A6 | 6.617664E−10 |
| A7 | 5.655299E−11 |
| A8 | −4.406643E−12 |
| A9 | 4.336422E−14 |
| A10 | 3.637359E−15 |
| A11 | −1.252064E−17 |
| A12 | −6.278635E−18 |
| A13 | 1.083594E−19 |
| A14 | 3.928111E−21 |
| A15 | −1.431683E−22 |
| A16 | 1.282501E−24 |

TABLE 6

EXAMPLE 2 • BASIC LENS DATA

| Si (SURFACE NUMBER) | Ri (CURVATURE RADIUS) | Di (SURFACE DISTANCE) | Ndi (REFRACTIVE INDEX) | vdj (ABBE NUMBER) | θ g, f (PARTIAL DISPERSION RATIO) |
|---|---|---|---|---|---|
| *1 | 1118.1599 | 3.00 | 1.772499 | 49.60 | 0.55212 |
| 2 | 134.0215 | 10.85 | | | |
| 3 | −197.8726 | 1.90 | 1.799516 | 42.22 | 0.56727 |
| 4 | 214.3676 | DD[4] | | | |
| 5 | 156.0336 | 2.30 | 1.800000 | 29.84 | 0.60178 |
| 6 | 77.2465 | 15.02 | 1.496999 | 81.54 | 0.53748 |
| 7 | −155.1544 | DD[7] | | | |
| 8 | 116.2018 | 7.57 | 1.433871 | 95.20 | 0.53733 |
| 9 | −1319.3557 | 0.20 | | | |
| 10 | 95.9125 | 12.94 | 1.433871 | 95.20 | 0.53733 |
| 11 | −153.7147 | 0.20 | | | |
| *12 | 60.8312 | 7.89 | 1.743198 | 49.34 | 0.55312 |
| 13 | 146.9923 | DD[13] | | | |
| 14 | 34.0446 | 0.80 | 2.001003 | 29.13 | 0.59952 |
| 15 | 15.5818 | DD[15] | | | |
| 16 | 120.5438 | 0.80 | 1.882997 | 40.76 | 0.56679 |
| 17 | 28.2452 | 2.67 | | | |
| 18 | −472.6907 | 6.19 | 1.808095 | 22.76 | 0.63073 |
| 19 | −14.6590 | 0.80 | 1.816000 | 46.62 | 0.55682 |
| 20 | 71.7680 | 0.15 | | | |
| 21 | 30.0934 | 5.40 | 1.712995 | 53.87 | 0.54587 |
| 22 | −30.0934 | 0.90 | 1.882997 | 40.76 | 0.56679 |
| 23 | −959.3350 | DD[23] | | | |
| 24 | −24.8047 | 1.00 | 1.756998 | 47.82 | 0.55662 |
| 25 | 53.0499 | 2.39 | 1.922860 | 18.90 | 0.64960 |
| 26 | −797.1480 | DD[26] | | | |
| 27 (STOP) | ∞ | 2.48 | | | |
| 28 | −278.8115 | 3.49 | 1.882997 | 40.76 | 0.56679 |
| 29 | −45.4383 | 0.12 | | | |
| 30 | 60.0639 | 7.21 | 1.603112 | 60.64 | 0.54148 |
| 31 | −30.4146 | 1.50 | 1.804000 | 46.58 | 0.55730 |
| 32 | −369.2199 | 31.88 | | | |
| 33 | 719.1564 | 4.60 | 1.696797 | 55.53 | 0.54341 |
| 34 | −45.0329 | 0.53 | | | |
| 35 | 43.4947 | 6.14 | 1.487490 | 70.23 | 0.53007 |
| 36 | −45.0578 | 1.60 | 1.882997 | 40.76 | 0.56679 |
| 37 | 35.5739 | 3.15 | | | |
| 38 | 35.2860 | 8.12 | 1.496999 | 81.54 | 0.53748 |
| 39 | −23.1235 | 1.50 | 1.806100 | 33.27 | 0.58845 |
| 40 | −186.2093 | 0.12 | | | |
| 41 | 60.2392 | 5.22 | 1.540720 | 47.23 | 0.56511 |
| 42 | −46.9134 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 11.02 | | | |

TABLE 7

EXAMPLE 2 • DATA ABOUT VARIABLE MAGNIFICATION

| | WIDE-ANGLE END | MIDDLE | TELEPHOTO END |
|---|---|---|---|
| ZOOM MAGNIFICATION RATIO | 1.0 | 5.7 | 18.2 |
| f | 7.64 | 43.55 | 139.05 |
| Bf | 40.24 | 40.24 | 40.24 |
| FNo. | 1.87 | 1.87 | 2.72 |
| 2ω[°] | 74.49 | 14.23 | 4.53 |
| DD[13] | 0.80 | 40.25 | 49.38 |
| DD[15] | 7.21 | 11.21 | 14.21 |
| DD[23] | 49.77 | 4.20 | 3.27 |
| DD[26] | 10.64 | 12.76 | 1.56 |

TABLE 8

EXAMPLE 2 • DATA ABOUT FOCUS

| | inf | 3m | 0.55m |
|---|---|---|---|
| DD[4] | 1.00 | 3.92 | 14.97 |
| DD[7] | 14.56 | 11.64 | 0.59 |

TABLE 9

EXAMPLE 2 • ASPHERICAL SURFACE DATA(1)

| SURFACE NUMBER | 1 |
|---|---|
| KA | −4.58137E+02 |
| A3 | 5.16186E−06 |
| A4 | −1.32039E−06 |
| A5 | 2.51247E−07 |
| A6 | −2.76734E−08 |
| A7 | 1.94629E−09 |

TABLE 9-continued

EXAMPLE 2 • ASPHERICAL SURFACE DATA(1)

| SURFACE NUMBER | 1 |
|---|---|
| A8 | −8.79742E−11 |
| A9 | 2.49075E−12 |
| A10 | −4.22860E−14 |
| A11 | 4.74370E−16 |
| A12 | −8.93631E−18 |
| A13 | 2.62159E−19 |
| A14 | −4.54316E−21 |
| A15 | 3.85676E−23 |
| A16 | −1.29271E−25 |

TABLE 10

EXAMPLE 2 • ASPHERICAL SURFACE DATA(2)

| SURFACE NUMBER | 12 |
|---|---|
| KA | 9.61547E−01 |
| A3 | −2.62582E−06 |
| A4 | 4.45866E−07 |
| A5 | −1.10434E−07 |
| A6 | 1.08058E−08 |
| A7 | −6.30961E−10 |
| A8 | 1.75806E−11 |
| A9 | 8.12145E−14 |
| A10 | −1.73754E−14 |
| A11 | 1.07011E−16 |
| A12 | 1.64768E−17 |
| A13 | −3.33030E−19 |
| A14 | −5.84026E−21 |
| A15 | 2.48068E−22 |
| A16 | −2.17774E−24 |

TABLE 11

EXAMPLE 3 • BASIC LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | θ g, f (PARTIAL DISPERSION RATIO) |
|---|---|---|---|---|---|
| *1 | 992.2898 | 3.00 | 1.772499 | 49.60 | 0.55212 |
| 2 | 127.8302 | 11.05 | | | |
| 3 | −202.6024 | 1.90 | 1.834807 | 42.73 | 0.56486 |
| 4 | 205.5604 | DD[4] | | | |
| 5 | 152.5617 | 2.30 | 1.800000 | 29.84 | 0.60178 |
| 6 | 75.6948 | 15.24 | 1.496999 | 81.54 | 0.53748 |
| 7 | −155.1398 | DD[7] | | | |
| 8 | 118.6128 | 6.61 | 1.433871 | 95.20 | 0.53733 |
| 9 | 3239.8919 | 0.20 | | | |
| 10 | 96.9841 | 13.61 | 1.433871 | 95.20 | 0.53733 |
| 11 | −130.0249 | 0.20 | | | |
| *12 | 58.2585 | 7.66 | 1.772499 | 49.60 | 0.55212 |
| 13 | 135.2680 | DD[13] | | | |
| 14 | 25.4986 | 0.80 | 2.003300 | 28.27 | 0.59802 |
| 15 | 16.0567 | DD[15] | | | |
| 16 | 326.9593 | 0.80 | 1.903658 | 31.32 | 0.59481 |
| 17 | 21.9588 | 3.35 | | | |
| 18 | −477.0272 | 6.00 | 1.808095 | 22.76 | 0.63073 |
| 19 | −15.0500 | 0.80 | 1.816000 | 46.62 | 0.55682 |
| 20 | 114.4553 | 0.22 | | | |
| 21 | 27.5234 | 5.72 | 1.595509 | 39.24 | 0.58043 |
| 22 | −28.0326 | 0.90 | 1.882997 | 40.76 | 0.56679 |
| 23 | −470.6662 | DD[23] | | | |
| 24 | −25.5089 | 1.00 | 1.658441 | 50.88 | 0.55612 |
| 25 | 62.1801 | 2.12 | 1.922860 | 18.90 | 0.64960 |
| 26 | 1386.7600 | DD[26] | | | |
| 27 (STOP) | ∞ | 2.38 | | | |
| 28 | −168.7501 | 3.25 | 1.882997 | 40.76 | 0.56679 |
| 29 | −45.4086 | 0.19 | | | |
| 30 | 54.0744 | 7.41 | 1.583126 | 59.38 | 0.54345 |
| 31 | −29.4883 | 1.50 | 1.804000 | 46.58 | 0.55730 |
| 32 | −273.7251 | 32.84 | | | |
| 33 | −420.3840 | 4.33 | 1.799516 | 42.22 | 0.56727 |
| 34 | −42.6096 | 0.30 | | | |
| 35 | 41.7533 | 6.26 | 1.487490 | 70.23 | 0.53007 |
| 36 | −42.5170 | 1.60 | 1.882997 | 40.76 | 0.56679 |
| 37 | 35.1796 | 0.75 | | | |
| 38 | 33.2830 | 8.60 | 1.496999 | 81.54 | 0.53748 |
| 39 | −21.4796 | 1.50 | 1.806100 | 33.27 | 0.58845 |
| 40 | −241.8010 | 0.12 | | | |
| 41 | 58.8687 | 5.63 | 1.531717 | 48.84 | 0.56309 |
| 42 | −41.3435 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 12.01 | | | |

TABLE 12

EXAMPLE 3 • DATA ABOUT VARIABLE MAGNIFICATION

| | WIDE-ANGLE END | MIDDLE | TELEPHOTO END |
|---|---|---|---|
| ZOOM MAGNIFICATION RATIO | 1.0 | 5.7 | 18.2 |
| f | 7.63 | 43.51 | 138.92 |
| Bf | 41.23 | 41.23 | 41.23 |
| FNo. | 1.87 | 1.87 | 2.74 |
| 2ω[°] | 74.64 | 14.21 | 4.52 |
| DD[13] | 0.80 | 38.40 | 46.83 |
| DD[15] | 8.25 | 12.25 | 15.25 |
| DD[23] | 49.28 | 3.48 | 4.15 |
| DD[26] | 9.19 | 13.38 | 1.30 |

TABLE 13

EXAMPLE 3 • DATA ABOUT FOCUS

| | inf | 3m | 0.55m |
|---|---|---|---|
| DD[4] | 1.01 | 3.73 | 14.08 |
| DD[7] | 13.67 | 10.95 | 0.59 |

TABLE 14

EXAMPLE 3 • ASPHERICAL SURFACE DATA(1)

| SURFACE NUMBER | 1 |
|---|---|
| KA | −4.468497E+01 |
| A3 | 2.777523E−06 |
| A4 | −1.060854E−06 |
| A5 | 1.873957E−07 |

TABLE 14-continued

EXAMPLE 3 • ASPHERICAL SURFACE DATA(1)

| SURFACE NUMBER | 1 |
|---|---|
| A6 | −1.617402E−08 |
| A7 | 8.274842E−10 |
| A8 | −2.532251E−11 |
| A9 | 4.543772E−13 |
| A10 | −7.531673E−15 |
| A11 | 2.430208E−16 |
| A12 | −3.513915E−18 |
| A13 | −1.593706E−19 |
| A14 | 7.513811E−21 |
| A15 | −1.179792E−22 |
| A16 | 6.701519E−25 |

TABLE 15

EXAMPLE 3 • ASPHERICAL SURFACE DATA(2)

| SURFACE NUMBER | 12 |
|---|---|
| KA | 9.762715E−01 |
| A3 | −1.967016E−06 |
| A4 | 6.067136E−07 |
| A5 | −1.852765E−07 |
| A6 | 2.475162E−08 |
| A7 | −2.265087E−09 |
| A8 | 1.402363E−10 |
| A9 | −5.831184E−12 |
| A10 | 1.628599E−13 |
| A11 | −3.370140E−15 |
| A12 | 7.337566E−17 |
| A13 | −1.908439E−18 |
| A14 | 3.789332E−20 |
| A15 | −4.123364E−22 |
| A16 | 1.779160E−24 |

TABLE 16

EXAMPLE 4 • BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| *1 | −1080.8974 | 2.80 | 1.804000 | 46.58 | 0.55730 |
| 2 | 135.8985 | 9.79 | | | |
| 3 | −257.7360 | 1.90 | 1.834807 | 42.73 | 0.56486 |
| 4 | 440.7035 | DD[4] | | | |
| 5 | 156.1196 | 2.10 | 1.800000 | 29.84 | 0.60178 |
| 6 | 81.1824 | 14.33 | 1.496999 | 81.54 | 0.53748 |
| 7 | −174.0494 | DD[7] | | | |
| 8 | 117.1416 | 7.06 | 1.433871 | 95.20 | 0.53733 |
| 9 | 3789.5474 | 0.20 | | | |
| 10 | 128.8708 | 10.95 | 1.433871 | 95.20 | 0.53733 |
| 11 | −153.5083 | 0.20 | | | |
| *12 | 55.6993 | 8.50 | 1.729157 | 54.68 | 0.54451 |
| 13 | 140.8106 | DD[13] | | | |
| 14 | 46.2979 | 0.80 | 2.001003 | 29.13 | 0.59952 |
| 15 | 16.2016 | DD[15] | | | |
| 16 | 91.1180 | 0.80 | 1.903658 | 31.32 | 0.59481 |
| 17 | 34.4758 | 2.43 | | | |
| 18 | −656.5355 | 6.50 | 1.805181 | 25.42 | 0.61616 |
| 19 | −14.2544 | 0.80 | 1.746931 | 50.95 | 0.54910 |
| 20 | 43.7667 | 1.01 | | | |
| 21 | 29.0914 | 5.63 | 1.658441 | 50.88 | 0.55612 |
| 22 | −28.7417 | 0.80 | 1.882997 | 40.76 | 0.56679 |
| 23 | −200.0704 | DD[23] | | | |

TABLE 16-continued

EXAMPLE 4 • BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| 24 | −25.9687 | 0.80 | 1.772499 | 49.60 | 0.55212 |
| 25 | 55.2918 | 2.39 | 1.922860 | 18.90 | 0.64960 |
| 26 | −768.2726 | DD[26] | | | |
| 27 (STOP) | ∞ | 2.30 | | | |
| 28 | −208.8837 | 3.53 | 1.882997 | 40.76 | 0.56679 |
| 29 | −43.0643 | 0.55 | | | |
| 30 | 79.9057 | 7.16 | 1.650996 | 56.16 | 0.54818 |
| 31 | −27.9833 | 1.20 | 1.804000 | 46.58 | 0.55730 |
| 32 | −386.4888 | 33.00 | | | |
| 33 | −330.4341 | 4.29 | 1.696797 | 55.53 | 0.54341 |
| 34 | −41.1004 | 0.76 | | | |
| 35 | 48.5223 | 5.96 | 1.487490 | 70.23 | 0.53007 |
| 36 | −41.9805 | 1.60 | 1.882997 | 40.76 | 0.56679 |
| 37 | 45.0118 | 1.59 | | | |
| 38 | 41.6540 | 7.70 | 1.496999 | 81.54 | 0.53748 |
| 39 | −23.4390 | 1.20 | 1.806100 | 33.27 | 0.58845 |
| 40 | −139.2414 | 0.61 | | | |
| 41 | 64.0318 | 5.25 | 1.517417 | 52.43 | 0.55649 |
| 42 | −45.5434 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 11.94 | | | |

TABLE 17

EXAMPLE 4 • DATA ABOUT VARIABLE MAGNIFICATION

| | WIDE-ANGLE END | MIDDLE | TELEPHOTO END |
|---|---|---|---|
| ZOOM MAGNIFICATION RATIO | 1.0 | 5.7 | 18.3 |
| f | 7.64 | 43.72 | 139.88 |
| Bf | 41.16 | 41.16 | 41.16 |
| FNo. | 1.87 | 1.87 | 2.71 |
| 2ω [°] | 74.39 | 14.21 | 4.50 |
| DD[13] | 0.80 | 41.64 | 50.88 |
| DD[15] | 6.77 | 11.27 | 14.77 |
| DD[23] | 50.61 | 4.08 | 3.44 |
| DD[26] | 12.16 | 13.35 | 1.25 |

TABLE 18

EXAMPLE 4 • DATA ABOUT FOCUS

| | inf | 3m | 0.55m |
|---|---|---|---|
| DD[4] | 1.00 | 4.37 | 17.02 |
| DD[7] | 16.61 | 13.25 | 0.59 |

TABLE 19

EXAMPLE 4 • ASPHERICAL SURFACE DATA(1)

| SURFACE NUMBER | 1 |
|---|---|
| KA | −1.638686E+03 |
| A3 | −7.984087E−07 |
| A4 | −7.445182E−07 |
| A5 | 1.455516E−07 |
| A6 | −1.209683E−08 |
| A7 | 4.480628E−10 |
| A8 | 9.212129E−13 |

TABLE 19-continued

EXAMPLE 4 • ASPHERICAL SURFACE DATA(1)

| SURFACE NUMBER | 1 |
|---|---|
| A9 | −6.783062E−13 |
| A10 | 1.950646E−14 |
| A11 | 1.511816E−17 |
| A12 | −7.066382E−18 |
| A13 | −8.845084E−20 |
| A14 | 7.960287E−21 |
| A15 | −1.346019E−22 |
| A16 | 7.617207E−25 |

TABLE 20

EXAMPLE 4 • ASPHERICAL SURFACE DATA(2)

| SURFACE NUMBER | 12 |
|---|---|
| KA | 9.599348E−01 |
| A3 | 4.508169E−07 |
| A4 | −4.588327E−08 |
| A5 | −1.814323E−08 |
| A6 | −2.546687E−10 |
| A7 | 9.137975E−11 |
| A8 | −3.140506E−12 |
| A9 | −6.383125E−14 |
| A10 | 3.345302E−15 |
| A11 | 1.490242E−16 |
| A12 | −9.156579E−18 |
| A13 | 8.923339E−20 |
| A14 | 2.994286E−21 |
| A15 | −7.461677E−23 |
| A16 | 4.697905E−25 |

TABLE 21

EXAMPLE 5 • BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| *1 | 1148.5775 | 2.00 | 1.788001 | 47.37 | 0.55598 |
| 2 | 140.6095 | 10.83 | | | |
| 3 | −195.6697 | 1.80 | 1.834807 | 42.73 | 0.56486 |
| 4 | 212.7958 | DD[4] | | | |
| 5 | 126.7529 | 2.00 | 1.805181 | 25.42 | 0.61616 |
| 6 | 75.4660 | 16.38 | 1.438750 | 94.93 | 0.53433 |
| 7 | −154.3092 | DD[7] | | | |
| 8 | 101.2845 | 8.04 | 1.433871 | 95.20 | 0.53733 |
| 9 | −16671.7552 | 0.20 | | | |
| 10 | 86.0211 | 12.95 | 1.433871 | 95.20 | 0.53733 |
| 11 | −192.9017 | 0.20 | | | |
| *12 | 60.0092 | 6.78 | 1.788001 | 47.37 | 0.55598 |
| 13 | 151.5548 | DD[13] | | | |
| 14 | 30.6562 | 0.80 | 2.001003 | 29.13 | 0.59952 |
| 15 | 16.6089 | DD[15] | | | |
| 16 | 186.9512 | 0.80 | 1.882997 | 40.76 | 0.56679 |
| 17 | 22.6712 | 3.10 | | | |
| 18 | 946.0474 | 6.61 | 1.808095 | 22.76 | 0.63073 |
| 19 | −14.2966 | 0.80 | 1.816000 | 46.62 | 0.55682 |
| 20 | 93.0335 | 0.36 | | | |
| 21 | 27.5953 | 5.88 | 1.648498 | 53.02 | 0.55487 |
| 22 | −26.2350 | 0.80 | 1.882997 | 40.76 | 0.56679 |
| 23 | 709.7970 | DD[23] | | | |
| 24 | −24.0962 | 0.80 | 1.699998 | 48.08 | 0.55960 |
| 25 | 59.6189 | 2.26 | 1.922860 | 18.90 | 0.64960 |
| 26 | −1095.0797 | DD[26] | | | |
| 27 (STOP) | ∞ | 2.14 | | | |
| 28 | −309.2427 | 3.65 | 1.882997 | 40.76 | 0.56679 |
| 29 | −42.6250 | 0.12 | | | |
| 30 | 62.1599 | 6.85 | 1.563839 | 60.67 | 0.54030 |
| 31 | −31.2361 | 1.20 | 1.804000 | 46.58 | 0.55730 |
| 32 | −350.1700 | 35.55 | | | |
| 33 | 1728.0143 | 4.55 | 1.696797 | 55.53 | 0.54341 |
| 34 | −43.4526 | 0.30 | | | |
| 35 | 42.0210 | 6.15 | 1.487490 | 70.23 | 0.53007 |
| 36 | −43.4961 | 1.60 | 1.882997 | 40.76 | 0.56679 |
| 37 | 36.7305 | 0.12 | | | |
| 38 | 33.4089 | 8.16 | 1.496999 | 81.54 | 0.53748 |
| 39 | −23.5594 | 1.50 | 1.806100 | 33.27 | 0.58845 |
| 40 | −329.1716 | 0.12 | | | |
| 41 | 64.6880 | 5.12 | 1.567322 | 42.82 | 0.57309 |
| 42 | −46.3994 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 11.60 | | | |

TABLE 22

EXAMPLE 5 • DATA ABOUT VARIABLE MAGNIFICATION

| | WIDE-ANGLE END | MIDDLE | TELEPHOTO END |
|---|---|---|---|
| ZOOM MAGNIFICATION RATIO | 1.0 | 5.7 | 18.2 |
| f | 7.61 | 43.37 | 138.48 |
| Bf | 40.82 | 40.82 | 40.82 |
| FNo. | 1.87 | 1.87 | 2.73 |
| 2ω [°] | 74.60 | 14.24 | 4.54 |
| DD[13] | 0.80 | 37.00 | 45.04 |
| DD[15] | 7.64 | 11.64 | 14.64 |
| DD[23] | 47.67 | 4.50 | 4.84 |
| DD[26] | 9.67 | 12.64 | 1.26 |

TABLE 23

EXAMPLE 5 • DATA ABOUT FOCUS

| | inf | 3m | 0.55m |
|---|---|---|---|
| DD[4] | 1.00 | 3.89 | 14.83 |
| DD[7] | 14.42 | 11.53 | 0.59 |

TABLE 24

EXAMPLE 5 • ASPHERICAL SURFACE DATA(1)

| SURFACE NUMBER | 1 |
|---|---|
| KA | −1.292987E+02 |
| A3 | 2.440017E−06 |
| A4 | −8.390146E−07 |
| A5 | 1.546545E−07 |
| A6 | −1.164077E−08 |

TABLE 24-continued

EXAMPLE 5 • ASPHERICAL SURFACE DATA(1)

| SURFACE NUMBER | 1 |
|---|---|
| A7  | 4.013569E−10 |
| A8  | 1.146383E−12 |
| A9  | −6.186674E−13 |
| A10 | 1.884950E−14 |
| A11 | 7.155295E−18 |
| A12 | −1.177701E−17 |
| A13 | 2.107606E−19 |
| A14 | 6.021065E−22 |
| A15 | −5.102732E−23 |
| A16 | 3.970978E−25 |

TABLE 25

EXAMPLE 5 • ASPHERICAL SURFACE DATA(2)

| SURFACE NUMBER | 12 |
|---|---|
| KA  | 9.145537E−01 |
| A3  | −1.201768E−06 |
| A4  | 9.649789E−08 |
| A5  | −6.336666E−08 |
| A6  | 6.014201E−09 |
| A7  | −4.254424E−10 |
| A8  | 1.961689E−11 |
| A9  | −4.640334E−13 |
| A10 | 6.193828E−16 |
| A11 | 4.537461E−17 |
| A12 | 1.224673E−17 |
| A13 | −5.359197E−19 |
| A14 | 6.392771E−21 |
| A15 | 3.632484E−23 |
| A16 | −9.107176E−25 |

TABLE 26

EXAMPLE 6 • BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| *1  | 3050.5864  | 3.00    | 1.772499 | 49.60 | 0.55212 |
| 2   | 155.4752   | 10.53   |          |       |         |
| 3   | −183.0713  | 1.90    | 1.806098 | 40.92 | 0.57019 |
| 4   | 214.7203   | DD[4]   |          |       |         |
| 5   | 135.6184   | 2.30    | 1.800000 | 29.84 | 0.60178 |
| 6   | 73.1906    | 14.48   | 1.496999 | 81.54 | 0.53748 |
| 7   | −204.5823  | DD[7]   |          |       |         |
| 8   | 93.2267    | 9.30    | 1.433871 | 95.20 | 0.53733 |
| 9   | −1004.4591 | 0.15    |          |       |         |
| 10  | 86.7192    | 12.02   | 1.433871 | 95.20 | 0.53733 |
| 11  | −225.9939  | 0.15    |          |       |         |
| *12 | 61.5434    | 7.63    | 1.772499 | 49.60 | 0.55212 |
| 13  | 160.2760   | DD[13]  |          |       |         |
| 14  | 32.0360    | 0.80    | 2.001003 | 29.13 | 0.59952 |
| 15  | 15.6085    | DD[15]  |          |       |         |
| 16  | 122.1226   | 0.80    | 1.882997 | 40.76 | 0.56679 |
| 17  | 24.5558    | 3.08    |          |       |         |
| 18  | −263.9081  | 5.83    | 1.808095 | 22.76 | 0.63073 |
| 19  | −14.7147   | 0.80    | 1.816000 | 46.62 | 0.55682 |
| 20  | 62.2098    | 0.12    |          |       |         |
| 21  | 29.0602    | 5.82    | 1.658441 | 50.88 | 0.55612 |
| 22  | −27.6414   | 0.90    | 1.882997 | 40.76 | 0.56679 |
| 23  | −109.3731  | DD[23]  |          |       |         |
| 24  | −23.7371   | 1.00    | 1.743997 | 44.78 | 0.56560 |
| 25  | 54.1151    | 2.18    | 1.922860 | 18.90 | 0.64960 |
| 26  | −469.8193  | DD[26]  |          |       |         |
| 27 (STOP) | ∞    | 1.99    |          |       |         |
| 28  | −363.1046  | 3.58    | 1.882997 | 40.76 | 0.56679 |
| 29  | −43.9952   | 0.20    |          |       |         |
| 30  | 93.7337    | 7.07    | 1.589130 | 61.14 | 0.54067 |
| 31  | −25.6186   | 1.50    | 1.772499 | 49.60 | 0.55212 |
| 32  | −146.0468  | 31.89   |          |       |         |
| 33  | 390.3807   | 5.21    | 1.696797 | 55.53 | 0.54341 |
| 34  | −40.8550   | 0.71    |          |       |         |
| 35  | 61.8917    | 6.39    | 1.487490 | 70.23 | 0.53007 |
| 36  | −32.4830   | 1.60    | 1.882997 | 40.76 | 0.56679 |
| 37  | 59.4043    | 2.67    |          |       |         |
| 38  | 72.0074    | 7.28    | 1.496999 | 81.54 | 0.53748 |
| 39  | −20.2283   | 1.50    | 1.800000 | 29.84 | 0.60178 |
| 40  | −134.4753  | 1.03    |          |       |         |
| 41  | 81.8770    | 5.74    | 1.581439 | 40.75 | 0.57757 |
| 42  | −37.2180   | 0.20    |          |       |         |

TABLE 26-continued

EXAMPLE 6 • BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 10.51 | | | |

TABLE 27

EXAMPLE 6 • DATA ABOUT VARIABLE MAGNIFICATION

| | WIDE-ANGLE END | MIDDLE | TELEPHOTO END |
|---|---|---|---|
| ZOOM MAGNIFICATION RATIO | 1.0 | 5.7 | 18.3 |
| f | 7.63 | 43.62 | 139.55 |
| Bf | 39.73 | 39.73 | 39.73 |
| FNo. | 1.87 | 1.87 | 2.71 |
| 2ω [°] | 74.72 | 14.17 | 4.50 |
| DD[13] | 0.80 | 37.29 | 45.23 |
| DD[15] | 7.57 | 11.87 | 14.57 |
| DD[23] | 47.17 | 4.86 | 5.92 |
| DD[26] | 11.27 | 12.79 | 1.09 |

TABLE 28

EXAMPLE 6 • DATA ABOUT FOCUS

| | inf | 3m | 0.55m |
|---|---|---|---|
| DD[4] | 1.03 | 4.12 | 15.76 |
| DD[7] | 15.32 | 12.23 | 0.59 |

TABLE 29

EXAMPLE 6 • ASPHERICAL SURFACE DATA(1)

| SURFACE NUMBER | 1 |
|---|---|
| KA | −5.262102E+01 |
| A3 | 1.478393E−06 |
| A4 | 6.136511E−07 |
| A5 | −2.043531E−07 |
| A6 | 3.143525E−08 |

TABLE 29-continued

EXAMPLE 6 • ASPHERICAL SURFACE DATA(1)

| SURFACE NUMBER | 1 |
|---|---|
| A7 | −2.527448E−09 |
| A8 | 1.110050E−10 |
| A9 | −2.303459E−12 |
| A10 | 6.442931E−15 |
| A11 | −4.126190E−16 |
| A12 | 8.422049E−17 |
| A13 | −3.588192E−18 |
| A14 | 7.234282E−20 |
| A15 | −7.388562E−22 |
| A16 | 3.096807E−24 |

TABLE 30

EXAMPLE 6 • ASPHERICAL SURFACE DATA(2)

| SURFACE NUMBER | 12 |
|---|---|
| KA | 9.083037E−01 |
| A3 | −2.063300E−06 |
| A4 | 3.148055E−08 |
| A5 | −3.469585E−08 |
| A6 | 8.909404E−10 |
| A7 | 4.382904E−11 |
| A8 | −3.852300E−12 |
| A9 | 5.095699E−14 |
| A10 | 4.710080E−15 |
| A11 | −2.760229E−16 |
| A12 | 6.190504E−18 |
| A13 | 8.407242E−21 |
| A14 | −4.145739E−21 |
| A15 | 9.610231E−23 |
| A16 | −7.468715E−25 |

Table 31 shows values corresponding to conditional formulas (1) through (4) for the variable magnification optical systems in Examples 1 through 6. In all of the examples, d-line is a reference wavelength. Values in the tables of data at the aforementioned variable magnification and the following Table 31 show values at the reference wavelength.

TABLE 31

| FORMULA NUMBER | CONDITIONAL FORMULA | EXAMPLE 1 | EXAMPLE 2 | EXAMPLE 3 | EXAMPLE 4 | EXAMPLE 5 | EXAMPLE 6 |
|---|---|---|---|---|---|---|---|
| (1) | 0.10 > f2/f3 < 2.00 | 0.734 | 0.514 | 1.515 | 0.252 | 1.066 | 0.652 |
| (2) | 2.0 ≤ LN2 | 2.00100 | 2.00100 | 2.00330 | 2.00100 | 2.00100 | 2.00100 |
| (3) | 0.20 < N1r3 − N1r12 | 0.33863 | 0.30933 | 0.33863 | 0.29529 | 0.35413 | 0.33863 |
| (4) | 20 < ν 1r12 − ν 1r3 | 45.60 | 45.86 | 45.60 | 40.52 | 47.83 | 45.60 |

FIG. 7, Sections A through L show aberration diagrams of the variable magnification optical system in Example 1. FIG. 7, Sections A, B, C and D illustrate a spherical aberration, astigmatism, distortion aberration (distortion) and a lateral chromatic aberration at a wide-angle end, respectively. FIG. 7, Sections E, F, G and H illustrate a spherical aberration, astigmatism, distortion aberration (distortion) and a lateral chromatic aberration in a middle focal length state, respectively. FIG. 7, Sections I, J, K and L illustrate a spherical aberration, astigmatism, distortion aberration (distortion) and a lateral chromatic aberration at a telephoto end, respectively.

Each aberration diagram illustrating the spherical aberration, astigmatism and distortion (distortion aberration) shows an aberration when d-line (wavelength is 587.6 nm) is a reference wavelength. In the diagram of the spherical aberration and the diagram of the lateral chromatic aberration, a solid line, a long broken line, a short broken line and a gray line indicate aberrations for d-line (wavelength is 587.6 nm), C-line (wavelength is 656.3 nm), F-line (wavelength is 486.1 nm) and g-line (wavelength is 435.8 nm), respectively. In the diagram of the astigmatism, an aberration in a sagittal direction and an aberration in a tangential direction are indicated by a solid line and a broken line, respectively. In the diagram of the spherical aberration, Fno. represents an F-number. In the other diagrams, ω represents a half angle of view.

Similarly, FIG. 8, Sections A through L show aberration diagrams of the variable magnification optical system in Example 2 at a wide-angle end, in a middle focal length state, and at a telephoto end. FIG. 9, Sections A through L show aberration diagrams of the variable magnification optical system in Example 3 at a wide-angle end, in a middle focal length state, and at a telephoto end. FIG. 10, Sections A through L show aberration diagrams of the variable magnification optical system in Example 4 at a wide-angle end, in a middle focal length state, and at a telephoto end. FIG. 11, Sections A through L show aberration diagrams of the variable magnification optical system in Example 5 at a wide-angle end, in a middle focal length state, and at a telephoto end. FIG. 12, Sections A through L show aberration diagrams of the variable magnification optical system in Example 6 at a wide-angle end, in a middle focal length state, and at a telephoto end.

As these kinds of data show, all of the variable magnification optical systems in Examples 1 through 6 satisfy conditional formulas (1) through (4). It is recognized that they have excellent optical performance while the size of the optical system is small and the weight is light.

Next, an imaging apparatus according to an embodiment of the present invention will be described. FIG. 13 is a schematic diagram illustrating the configuration of an imaging apparatus using the variable magnification optical system according to an embodiment of the present invention, as an example of an imaging apparatus according to an embodiment of the present invention. The imaging apparatus is, for example, a surveillance camera, a video camera, an electronic still camera or the like using a solid-state imaging device, such as a CCD and a CMOS, as a recording medium.

An imaging apparatus 10 illustrated in FIG. 13 includes the variable magnification optical system 1, a filter 2 arranged on the image side of the variable magnification optical system 1, an imaging device 3 that images an image of a subject formed by the variable magnification optical system, a signal processing unit 4 that performs operation processing on a signal output from the imaging device 3, and a zoom control unit 5 for performing magnification change of the variable magnification optical system 1 and focus adjustment necessitated by the magnification change.

The variable magnification optical system 1 includes first lens group G1 having positive refractive power, and which is fixed during magnification change, second lens group G2 having negative refractive power, and which moves during magnification change, third lens group G3 having negative refractive power, and which moves during magnification change, fourth lens group G4 having negative refractive power, and which moves during magnification change, aperture stop St, which is fixed during magnification change, and fifth lens group G5 having positive refractive power, and which is fixed during magnification change, which are in this order from an object side.

In FIG. 13, each lens group is schematically illustrated. The imaging device 3 converts an optical image formed by the variable magnification optical system 1 into electrical signals. The imaging device 3 is arranged in such a manner that the imaging surface of the imaging device 3 is located at the same position as the image plane of the variable magnification optical system. For example, a CCD, a CMOS or the like may be used as the imaging device 3.

So far, the present invention has been described by using embodiments and examples. However, the present invention is not limited to the embodiments nor the examples, and various modifications are possible. For example, values, such as the curvature radius of each lens element, distances between surfaces, refractive indices, Abbe numbers and aspheric coefficients, are not limited to the values in the numerical value examples, but may be other values.

What is claimed is:

1. A variable magnification optical system consisting of:
   a first lens group having positive refractive power, and which is fixed during magnification change;
   a second lens group having negative refractive power;
   a third lens group having negative refractive power;
   a fourth lens group having negative refractive power; and
   a fifth lens group having positive refractive power, and which is fixed during magnification change, which are in this order from an object side,
   wherein the second lens group, the third lens group and the fourth lens group move in such a manner that a distance between the first lens group and the second lens group constantly becomes longer and a distance between the second lens group and the third lens group constantly becomes longer, compared with a wide-angle end, and a distance between the third lens group and the fourth lens group changes and a distance between the fourth lens group and the fifth lens group changes when magnification is changed from the wide-angle end to a telephoto end.

2. The variable magnification optical system, as defined in claim 1, wherein the fourth lens group temporarily moves toward the object side and reversely moves toward an image side when magnification is changed from the wide-angle end to the telephoto end.

3. The variable magnification optical system, as defined in claim 1, wherein the distance between the third lens group and the fourth lens group is the shortest when a focal length is closer to the wide-angle end than to the telephoto end during magnification change, and the distance at the wide-angle end is longer than the distance at the telephoto end.

4. The variable magnification optical system, as defined in claim 1, wherein the first lens group consists of a 1f-th lens group having negative refractive power, and which consists of two negative lenses, a 1m-th lens group having positive refractive power and a 1r-th lens group having positive refractive power, which are in this order from the object side, and
   wherein focusing is performed by moving the 1m-th lens group in the direction of an optical axis.

5. The variable magnification optical system, as defined in claim 4, wherein the 1m-th lens group is a cemented lens consisting of a concave meniscus lens with its convex surface facing the object side and a biconvex lens, which are in this order from the object side.

6. The variable magnification optical system, as defined in claim 1, wherein the following conditional formula (1) is satisfied when the focal length of the second lens group is f2 and the focal length of the third lens group is f3:

$$0.10 < f2/f3 < 2.00 \qquad (1).$$

7. The variable magnification optical system, as defined in claim 6, wherein the following conditional formula (1-1) is satisfied:

$$0.20 < f2/f3 < 1.60 \qquad (1\text{-}1).$$

8. The variable magnification optical system, as defined in claim 1, wherein the second lens group consists of only a concave meniscus lens with its convex surface facing the object side.

9. The variable magnification optical system, as defined in claim 8, wherein the following conditional formula (2) is satisfied when the refractive index of the concave meniscus lens is LN2:

$$2.0 \leq LN2 \qquad (2).$$

10. An imaging apparatus comprising:
   the variable magnification optical system, as defined in claim 1.

* * * * *